US008954861B1

(12) United States Patent
Takahashi et al.

(10) Patent No.: US 8,954,861 B1
(45) Date of Patent: Feb. 10, 2015

(54) ADMINISTRATOR CONFIGURABLE GADGET DIRECTORY FOR PERSONALIZED START PAGES

(75) Inventors: Ryohei Takahashi, Mountain View, CA (US); Shoumen Saha, San Francisco, CA (US); John Hjelmstad, Menlo Park, CA (US); Alan Kobrin, Mountain View, CA (US); Michael Horowitz, Manhattan Beach, CA (US); Sanjay Raman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1326 days.

(21) Appl. No.: 11/797,896

(22) Filed: May 8, 2007

Related U.S. Application Data

(60) Provisional application No. 60/835,861, filed on Aug. 7, 2006.

(51) Int. Cl.
*G06F 3/00* (2006.01)
*G06F 3/048* (2013.01)

(52) U.S. Cl.
USPC ........... 715/743; 715/741; 715/745; 715/810; 715/840

(58) Field of Classification Search
USPC ........................................................ 715/840
See application file for complete search history.

(56) References Cited

U.S. PATENT DOCUMENTS

| | | | |
|---|---|---|---|
| 5,179,657 A * | 1/1993 | Dykstal et al. ................ | 715/762 |
| 5,470,233 A | 11/1995 | Fruchterman et al. | |
| 5,537,526 A | 7/1996 | Anderson et al. | |
| 5,581,686 A | 12/1996 | Koppolu et al. | |
| 5,613,058 A | 3/1997 | Koppolu et al. | |
| 5,634,019 A | 5/1997 | Koppolu et al. | |
| 5,636,346 A | 6/1997 | Saxe | |

(Continued)

FOREIGN PATENT DOCUMENTS

| | | |
|---|---|---|
| EP | 1 026 610 | 8/2000 |
| EP | 1415245 | 2/2011 |

(Continued)

OTHER PUBLICATIONS

Abdelnur, Alejandro et al., Java Portlet Specification, version 1.0, JCP Program Management Office, Oct. 7, 2003, pp. 1-132, XP002631612, retrieved from the internet at http://jcp.org/aboutJava/communityprocess/final/jsr1168/index.html on Apr. 6, 2011, 123 pages.

(Continued)

*Primary Examiner* — Stephen Alvesteffer
(74) *Attorney, Agent, or Firm* — Fish & Richardson P.C.

(57) ABSTRACT

A method of facilitating the self-administration of a directory of available modules on a group's syndicated customizable content document or start page is presented. The method includes presenting an initial list of modules to an administrator of a group, enabling the administrator to identify module selection information that identifies criteria for inclusion and/or exclusion of one or more modules in a directory, and storing the module selection information identified by the administrator. When a user of the group accesses a customized content document, the user is presented with a modified list of available modules based on the module selection information. Using this method, the administrator is capable of excluding modules from a global list, including only a specific subset of modules, or a combination of both. A system of carrying out the method is also presented.

20 Claims, 17 Drawing Sheets

(56) References Cited

U.S. PATENT DOCUMENTS

| | | | |
|---|---|---|---|
| 5,640,579 A | 6/1997 | Koppolu et al. | |
| 5,724,521 A | 3/1998 | Dedrick et al. | |
| 5,754,175 A | 5/1998 | Koppolu et al. | |
| 5,801,701 A | 9/1998 | Koppolu et al. | |
| 5,812,862 A | 9/1998 | Smith et al. | |
| 5,835,919 A | 11/1998 | Stern et al. | |
| 5,845,265 A | 12/1998 | Woolston | |
| 5,845,281 A | 12/1998 | Benson et al. | |
| 5,905,492 A | 5/1999 | Straub et al. | |
| 5,910,804 A | 6/1999 | Fortenbery et al. | |
| 5,918,010 A | 6/1999 | Appleman et al. | |
| 5,920,854 A | 7/1999 | Kirsch et al. | |
| 5,931,901 A | 8/1999 | Wolfe et al. | |
| 5,974,398 A | 10/1999 | Hanson et al. | |
| 6,009,442 A * | 12/1999 | Chen et al. | 715/205 |
| 6,026,368 A | 2/2000 | Brown et al. | |
| 6,044,375 A | 3/2000 | Shmueli et al. | |
| 6,061,659 A | 5/2000 | Murray | |
| 6,067,570 A | 5/2000 | Kreynin et al. | |
| 6,078,866 A | 6/2000 | Buck et al. | |
| 6,134,552 A | 10/2000 | Fritz et al. | |
| 6,223,163 B1 | 4/2001 | Van Luchene | |
| 6,247,009 B1 | 6/2001 | Shiiyama et al. | |
| 6,253,189 B1 | 6/2001 | Feezell et al. | |
| 6,269,361 B1 | 7/2001 | Davis et al. | |
| 6,285,987 B1 | 9/2001 | Roth et al. | |
| 6,298,348 B1 | 10/2001 | Eldering | |
| 6,324,519 B1 | 11/2001 | Eldering | |
| 6,327,628 B1 * | 12/2001 | Anuff et al. | 719/311 |
| 6,336,132 B2 | 1/2002 | Appleman et al. | |
| 6,396,515 B1 | 5/2002 | Hetherington et al. | |
| 6,397,231 B1 * | 5/2002 | Salisbury et al. | 715/234 |
| 6,421,675 B1 | 7/2002 | Ryan et al. | |
| 6,430,688 B1 | 8/2002 | Kohl et al. | |
| 6,473,800 B1 | 10/2002 | Jerger et al. | |
| 6,601,057 B1 | 7/2003 | Underwood et al. | |
| 6,610,105 B1 | 8/2003 | Martin et al. | |
| 6,677,894 B2 | 1/2004 | Sheynblat et al. | |
| 6,677,968 B1 * | 1/2004 | Appelman | 715/853 |
| 6,681,371 B1 | 1/2004 | Devanbu | |
| 6,691,114 B1 | 2/2004 | Nakamura | |
| 6,813,640 B1 | 11/2004 | Benson et al. | |
| 6,826,572 B2 | 11/2004 | Colace et al. | |
| 6,912,532 B2 | 6/2005 | Andersen et al. | |
| 6,976,210 B1 | 12/2005 | Silva et al. | |
| 7,089,248 B1 | 8/2006 | King et al. | |
| 7,103,642 B1 | 9/2006 | Chen et al. | |
| 7,167,903 B2 | 1/2007 | Percival | |
| 7,234,107 B1 | 6/2007 | Aoki et al. | |
| 7,257,604 B1 | 8/2007 | Wolfe | |
| 7,281,060 B2 | 10/2007 | Hofmann et al. | |
| 7,290,006 B2 | 10/2007 | Xie et al. | |
| 7,376,907 B2 | 5/2008 | Santoro et al. | |
| 7,395,322 B2 | 7/2008 | Harvey et al. | |
| 7,406,510 B1 | 7/2008 | Feldman | |
| 7,441,185 B2 | 10/2008 | Coulson et al. | |
| 7,490,295 B2 | 2/2009 | Chaudhri et al. | |
| 7,512,622 B2 * | 3/2009 | Volk et al. | 1/1 |
| 7,542,951 B1 * | 6/2009 | Chakrabarti et al. | 706/45 |
| 7,653,721 B1 | 1/2010 | Romanov et al. | |
| 7,693,863 B2 * | 4/2010 | Martin et al. | 707/603 |
| 7,725,530 B2 | 5/2010 | Sah et al. | |
| 7,730,082 B2 | 6/2010 | Sah et al. | |
| 7,730,109 B2 | 6/2010 | Rohrs et al. | |
| 8,051,385 B1 * | 11/2011 | Yawitz et al. | 715/776 |
| 8,185,819 B2 | 5/2012 | Sah et al. | |
| 8,185,830 B2 | 5/2012 | Saha et al. | |
| 8,281,390 B1 | 10/2012 | Shah et al. | |
| 8,291,390 B2 | 10/2012 | Ilic et al. | |
| 8,407,250 B2 | 3/2013 | Saha et al. | |
| 2001/0042064 A1 | 11/2001 | Davis et al. | |
| 2001/0047297 A1 | 11/2001 | Wen | |
| 2001/0051911 A1 | 12/2001 | Marks et al. | |
| 2002/0002509 A1 | 1/2002 | Wagorn et al. | |
| 2002/0002525 A1 | 1/2002 | Arai et al. | |
| 2002/0005867 A1 | 1/2002 | Gvily | |
| 2002/0010672 A1 * | 1/2002 | Waelbroeck et al. | 705/37 |
| 2002/0023158 A1 * | 2/2002 | Polizzi et al. | 709/227 |
| 2002/0026359 A1 | 2/2002 | Long et al. | |
| 2002/0031230 A1 | 3/2002 | Sweet et al. | |
| 2002/0035536 A1 | 3/2002 | Gellman | |
| 2002/0038282 A1 | 3/2002 | Montgomery | |
| 2002/0046099 A1 | 4/2002 | Frengut et al. | |
| 2002/0046104 A1 | 4/2002 | Kaddeche et al. | |
| 2002/0046245 A1 | 4/2002 | Hillar et al. | |
| 2002/0065878 A1 | 5/2002 | Paxhia et al. | |
| 2002/0077891 A1 | 6/2002 | Castle et al. | |
| 2002/0087632 A1 * | 7/2002 | Keskar | 709/204 |
| 2002/0087667 A1 | 7/2002 | Andersen | |
| 2002/0091736 A1 | 7/2002 | Wall | |
| 2002/0099605 A1 | 7/2002 | Weitzman et al. | |
| 2002/0107913 A1 * | 8/2002 | Rivera et al. | 709/203 |
| 2002/0111898 A1 | 8/2002 | Numaoka et al. | |
| 2002/0123988 A1 | 9/2002 | Dean et al. | |
| 2002/0143819 A1 | 10/2002 | Han et al. | |
| 2002/0152114 A1 * | 10/2002 | Shumaker et al. | 705/12 |
| 2002/0152197 A1 | 10/2002 | Stocker et al. | |
| 2002/0156812 A1 | 10/2002 | Krasnoiarov et al. | |
| 2002/0165773 A1 | 11/2002 | Natsuno et al. | |
| 2002/0184097 A1 | 12/2002 | Hijiri et al. | |
| 2002/0184343 A1 | 12/2002 | Ashcroft | |
| 2002/0194062 A1 | 12/2002 | Linide | |
| 2002/0198780 A1 | 12/2002 | Kawakami et al. | |
| 2003/0028896 A1 | 2/2003 | Swart et al. | |
| 2003/0037334 A1 | 2/2003 | Khoo et al. | |
| 2003/0067497 A1 | 4/2003 | Pichon | |
| 2003/0070167 A1 | 4/2003 | Holtz et al. | |
| 2003/0081017 A1 | 5/2003 | Shenassa et al. | |
| 2003/0083937 A1 | 5/2003 | Hasegawa et al. | |
| 2003/0117437 A1 * | 6/2003 | Cook et al. | 345/764 |
| 2003/0126136 A1 | 7/2003 | Omoigui | |
| 2003/0140316 A1 * | 7/2003 | Lakritz | 715/536 |
| 2003/0149618 A1 | 8/2003 | Sender et al. | |
| 2003/0163372 A1 | 8/2003 | Kolsy | |
| 2003/0216963 A1 | 11/2003 | Ishiwaka et al. | |
| 2003/0227482 A1 * | 12/2003 | Bach et al. | 345/762 |
| 2003/0236729 A1 | 12/2003 | Epstein et al. | |
| 2004/0015397 A1 | 1/2004 | Barry et al. | |
| 2004/0019523 A1 | 1/2004 | Barry et al. | |
| 2004/0019610 A1 | 1/2004 | Burns | |
| 2004/0024812 A1 | 2/2004 | Park et al. | |
| 2004/0044571 A1 | 3/2004 | Bronnimann et al. | |
| 2004/0054577 A1 | 3/2004 | Inoue et al. | |
| 2004/0054589 A1 | 3/2004 | Nicholas et al. | |
| 2004/0059708 A1 | 3/2004 | Dean et al. | |
| 2004/0059712 A1 | 3/2004 | Dean et al. | |
| 2004/0068554 A1 | 4/2004 | Bales et al. | |
| 2004/0083202 A1 * | 4/2004 | Mu et al. | 707/3 |
| 2004/0093327 A1 | 5/2004 | Anderson et al. | |
| 2004/0093620 A1 | 5/2004 | Lino et al. | |
| 2004/0100488 A1 | 5/2004 | Kasper | |
| 2004/0119740 A1 | 6/2004 | Chang et al. | |
| 2004/0133660 A1 * | 7/2004 | Junghuber et al. | 709/219 |
| 2004/0139049 A1 | 7/2004 | Hancock et al. | |
| 2004/0143499 A1 | 7/2004 | Dietsch et al. | |
| 2004/0143843 A1 | 7/2004 | Khoo et al. | |
| 2004/0150673 A1 | 8/2004 | Dobronsky | |
| 2004/0153508 A1 | 8/2004 | Alcorn et al. | |
| 2004/0167928 A1 | 8/2004 | Anderson et al. | |
| 2004/0183831 A1 * | 9/2004 | Ritchy et al. | 345/762 |
| 2004/0205163 A1 | 10/2004 | Yagi | |
| 2004/0205554 A1 * | 10/2004 | Goswami et al. | 715/513 |
| 2004/0216034 A1 * | 10/2004 | Lection et al. | 715/500.1 |
| 2004/0249709 A1 | 12/2004 | Donovan et al. | |
| 2005/0021765 A1 * | 1/2005 | Flores et al. | 709/228 |
| 2005/0050021 A1 | 3/2005 | Timmons | |
| 2005/0065806 A1 | 3/2005 | Harik | |
| 2005/0071224 A1 | 3/2005 | Fikes et al. | |
| 2005/0080898 A1 * | 4/2005 | Block | 709/225 |
| 2005/0085272 A1 | 4/2005 | Anderson et al. | |
| 2005/0096979 A1 | 5/2005 | Koningstein | |
| 2005/0097180 A1 | 5/2005 | Abdelhak | |
| 2005/0101311 A1 * | 5/2005 | Weitzman et al. | 455/419 |
| 2005/0120288 A1 | 6/2005 | Boehme et al. | |

(56) References Cited

U.S. PATENT DOCUMENTS

| | | | |
|---|---|---|---|
| 2005/0131758 | A1 | 6/2005 | Desikan et al. |
| 2005/0131762 | A1 | 6/2005 | Bharat et al. |
| 2005/0138640 | A1 | 6/2005 | Fresko |
| 2005/0144069 | A1 | 6/2005 | Wiseman et al. |
| 2005/0160356 | A1* | 7/2005 | Albornoz et al. ............. 715/512 |
| 2005/0183026 | A1* | 8/2005 | Amano et al. ................ 715/764 |
| 2005/0198120 | A1 | 9/2005 | Reshef et al. |
| 2005/0198615 | A1 | 9/2005 | Choi et al. |
| 2005/0216335 | A1 | 9/2005 | Fikes et al. |
| 2005/0222900 | A1 | 10/2005 | Fuloria et al. |
| 2005/0222903 | A1 | 10/2005 | Buchheit et al. |
| 2005/0222989 | A1 | 10/2005 | Haveliwala et al. |
| 2005/0223002 | A1 | 10/2005 | Agarwal et al. |
| 2006/0015817 | A1 | 1/2006 | Fioretti et al. |
| 2006/0041548 | A1* | 2/2006 | Parsons et al. ................... 707/5 |
| 2006/0048068 | A1 | 3/2006 | Danninger |
| 2006/0074913 | A1 | 4/2006 | O'Sullivan et al. |
| 2006/0117016 | A1 | 6/2006 | Smith et al. |
| 2006/0123230 | A1 | 6/2006 | Hewett et al. |
| 2006/0129935 | A1* | 6/2006 | Deinlein et al. ............. 715/733 |
| 2006/0173985 | A1 | 8/2006 | Moore |
| 2006/0218133 | A1* | 9/2006 | Atkin et al. ....................... 707/4 |
| 2006/0259860 | A1 | 11/2006 | Kobashi |
| 2007/0006069 | A1 | 1/2007 | Smith et al. |
| 2007/0016867 | A1* | 1/2007 | Nickell et al. ................ 715/730 |
| 2007/0055748 | A1 | 3/2007 | Kim et al. |
| 2007/0083670 | A1 | 4/2007 | Kelley et al. |
| 2007/0101285 | A1 | 5/2007 | Mohr |
| 2007/0106803 | A1 | 5/2007 | Peterson et al. |
| 2007/0136201 | A1 | 6/2007 | Sah et al. |
| 2007/0136320 | A1 | 6/2007 | Sah et al. |
| 2007/0136337 | A1 | 6/2007 | Sah et al. |
| 2007/0136443 | A1 | 6/2007 | Sah et al. |
| 2007/0162842 | A1 | 7/2007 | Ambachtsheer et al. |
| 2007/0162845 | A1 | 7/2007 | Cave et al. |
| 2007/0192700 | A1 | 8/2007 | Sengar |
| 2007/0204010 | A1 | 8/2007 | Sah et al. |
| 2007/0288488 | A1 | 12/2007 | Rohrs et al. |
| 2008/0010345 | A1 | 1/2008 | Curtis et al. |
| 2008/0010387 | A1 | 1/2008 | Curtis et al. |
| 2008/0022133 | A1* | 1/2008 | Sobel et al. ................... 713/193 |
| 2008/0033956 | A1 | 2/2008 | Saha et al. |
| 2008/0034309 | A1* | 2/2008 | Louch et al. .................. 715/766 |
| 2008/0034441 | A1 | 2/2008 | Saha et al. |
| 2008/0082907 | A1 | 4/2008 | Sorotokin et al. |
| 2009/0006996 | A1 | 1/2009 | Saha et al. |
| 2009/0037935 | A1 | 2/2009 | Saha et al. |
| 2009/0204914 | A1 | 8/2009 | King et al. |
| 2009/0288025 | A1 | 11/2009 | King et al. |
| 2012/0221942 | A1 | 8/2012 | Sah et al. |
| 2012/0222128 | A1 | 8/2012 | Saha et al. |
| 2013/0018997 | A1 | 1/2013 | Saha et al. |

FOREIGN PATENT DOCUMENTS

| | | |
|---|---|---|
| WO | 00/38074 | 6/2000 |
| WO | 00/75840 | 12/2000 |
| WO | 2004/042525 | 5/2004 |

OTHER PUBLICATIONS

Braun, Chris et al., "Web Services for Remote Portlets Specification Version 1.0", The Organization for the Advancement of Structured Information Standards (OASIS), Sep. 3, 2003, XP002631614, retrieved from the internet at http://www.oasis-2000304-wsrp-spedification-1.0.pdf on Apr. 6, 2011, 86 pages.

Parkin, Stephanie, "Rapid Java and J2EE Development with IBM WebSphere Studio and IBM Rational Developer", IBM Software Group, Oct. 2004, XP002631615, retrieved from the internet at http://s7.compdfs/wp-radrwd-medres.pdf on Apr. 6, 2011, 44 pages.

HTML Techniques for Web Content Accessibility Guidelines 1.0, W3C Note 6 Nov. 2000, retrieved from the internet at http://www.w3.org/TR/WCAG10-HTML-TECHS/ on Oct. 19, 2011, 53 pages.

Start, "Start.com Developer Center: Updates and Events", retrieved from the internet at <http://start.com/developer/default.htm, retrieved from the internet on May 23, 2006; 2 pgs.

Start, "Start.com Developer Center: Getting Started with Start.com Gadgets", retrieved from the internet at <http://start.com/developer/gettingstarted.aspx, retrieved from the internet on May 23, 2006; 2 pgs.

Start, "Start.com Developer Center: Atlas Runtime Reference", retrieved from the internet at <http://start.com/developer/atlasruntime.aspx, retrieved from the internet on May 23, 2006; 6 pgs.

Start, "Start.com Developer Center: Bindings Reference", retrieved from the internet at <http://start.com/developer/binding_ref.aspx, retrieved from the internet on May 23, 2006; 11 pgs.

Techcrunch, "Profile—MSN Start.com", retrieved from the internet at <http://www.techcrunch.com/tag/Start.com/, dated Aug. 3, 2005 retrieved from the internet on May 10, 2006; 3 pgs.

Richard Macmanus, "Microsoft's Start.com Opens Up", retrieved from the internet at <http://blogs.zdnet.com/web2explorer/?p=9, dated Sep. 14, 2005, retrieved from the internet on May 23, 2006; 4 pgs.

Yahoo!, "Widgets—Information", retrieved from the internet at <http://widgets.yahoo.com/info, retrieved from the internet on May 23, 2006; 2 pgs.

Yahoo!, "Widgets—FAQ", retrieved from the internet at <http://widgets.yahoo.com/faq/, retrieved from the internet on May 23, 2006; 4 pgs.

Yahoo!, "Widgets—Basics", retrieved from the internet at <http:widgets.yahoo.com/basics/, retrieved from the internet on May 23, 2006; 4 pgs.

Yahoo!, "Widgets—Version History", retrieved from the internet at <http://widgets.yahoo.com/versionhistory/, retrieved from the internet on May 23, 2006; 11 pgs.

Yahoo!, "Konfabulator—Gallery", retrieved from the internet at <http://www.widgetgallery.com, retrieved from the internet on May 23, 2006; 3 pgs.

Michael Arrington, "Profile—Konfabulator/ Yahoo Widgets", retrieved from the internet at <http://www.techcrunch.com/tag/Konfabulator/, dated Jul. 26, 2005, retrieved from the internet on May 10, 2006; 6 pgs.

Apple, "Dashboard: Handy Widgets at your Command", retrieved from the internet at <http://www.apple.com/macosx/features/dashboard/, retrieved from the internet on May 23, 2006; 4 pgs.

Apple, "Featured Widget: Art Directors Toolkit Widget", retrieved from the internet at <http://www.apple.com/downloads/dashboard/, dated May 17, 2006, retrieved from the internet on May 23, 2006; 3 pgs.

Apple Computer, Inc., "Tiger Developer Overview Series: Developing Dashboard Widgets", retrieved from the internet at <http://developer.apple.com/macosx/dashboard.html, retrieved from the internet on May 23, 2006; 11 pgs.

Dashboard Exposed, "Newest Widgets", retrieved from the internet at <http:www.dashboardexposed.com/index/sitelinks-newest-action, retrieved from the internet on May 23, 2006; 5 pgs.

Bryan Castle, "Introduction to Web Services for Remote Portlets", retrieved from the internet at <http://www-128.ibm.com,developerworks/library/ws-wsrp/, dated Apr. 15, 2005, retrieved from the internet on May 23, 2006; 8 pgs.

Sun Microsystems, Inc., "Introduction to JSR 168—The Portlet Specification", retrieved from the internet at<http://developers.sun.com/prodtech/portalserver/reference/techart/jsr168/, dated Jul. 17, 2003, retrieved from the internet on May 23, 2006; 3 pgs.

Ron Lynn, et al., "Creating a JSR 168 Portlet for Use by Diverse Portals using Web Services for Remote Portlets", retrieved from the internet at <http://www-128.ibm.com/developerworks/websphere/library/tutorials/0510_lynn/0510_1yn . . . , dated Oct. 26, 2005, retrieved from the internet on May 10, 2006; 2 pgs.

"JSR 168, WSRP, Portlets & Enterprise Portal", retrieved from the internet at <http://portlets.blogspot.com/, dated May 17, 2006, retrieved from the internet on May 23, 2006; 18 pgs.

Daniel Rubio, "Web Services, portlets and WSRP", retrieved from the internet at <http://searchwebservices.techtarget.com/tip/

(56) References Cited

OTHER PUBLICATIONS 1,289483,sid26_gci1134722,00.html, dated Oct. 18, 2005, retrieved from the internet on May 23, 2006; 6 pgs.

Apple, "Exposé: Find the window you need. Now.", retrieved from the internet at <http://www.apple.com/macosx/features/expose/, retrieved from the internet on May 23, 2006; 2 pgs.

Google Introduces New Pricing for Popular Self-Service Online Advertising Program, http://www.google.com/press/pressrel/select.html, p. 1-2, dated Feb. 20, 2002, printed on Jul. 29, 2003; 2 pgs.

Julio Ojeda-Zapata. "Wild about widgets: Tiny computer programs are 'where the Web and the desktop meet.'" Knight Ridder Tribune News Service. Aug. 24, 2005. ProQuest Newsstand, ProQuest Web. Sep. 13, 2009, 3 pages.

Datta et al., "Accelerating dynamic Web content generation," Sep.-Oct. 2002, IEEE, 6:27-36.

Geigel et al., "Using genetic algorithms for album page layouts," Oct.-Dec. 2003, IEEE, 10:16-27.

Krieger et al, "The Emergence of Distributed Component Platforms," Mar. 1998, IEEE, 43-53.

Schaeck, "Web Services for Remote Portals (WSRP) Whitepaper," Sep. 22, 2002, 1-18.

Collection of pages from www.overture.com, printed on Jul. 29, 2003; 4 pgs.

Collection of pages from findwhat.com, http://www.findwhat.com, printed on Jul. 29, 2003; 50 pgs.

Collection of pages from Sprinks com, http://www.sprinks.com, printed on Jul. 29, 2003; 11 pgs.

Collection of pages from Kandoodle.com, http://www.kanoodle.com, printed on Jul. 29, 2003; 5 pgs.

Collection of pages from Google Advertising, http://www.google.com, printed on Jul. 29, 2003; 80 pgs.

Chris Sherman, "Google Launches AdWords Select," Feb. 20, 2002, 6 pages.

Notification of Transmittal of the International Search Report and the Written Opinion of the International Search Authority, or the Declaration (4 pages); Written Opinion of the International Searching Authority (6 pages), and International Search Report (2 pages) for International Application No. PCT/US 06/46976 mailed Mar. 13, 2008.

Notification of Transmittal of the International Search Report and the Written Opinion of the International Search Authority, or the Declaration (4 pages); Written Opinion of the International Searching Authority (4 pages), and International Search Report (2 pages) for International Application No. PCT/US 06/46974 mailed Mar. 13, 2008.

Notification of Transmittal of the International Search Report and the Written Opinion of the International Search Authority, or the Declaration (4 pages); Written Opinion of the International Searching Authority (5 pages), and International Search Report (2 pages) for International Application No. PCT/US 06/46975 mailed Mar. 13, 2008.

Notification of Transmittal of the International Search Report and the Written Opinion of the International Search Authority, or the Declaration (4 pages); Written Opinion of the International Searching Authority (5 pages), and International Search Report (2 pages) for International Application No. PCT/US 06/46973 mailed Mar. 13, 2008.

Notification of Transmittal of the International Search Report and the Written Opinion of the International Search Authority, or the Declaration (4 pages); Written Opinion of the International Searching Authority (3 pages), and International Search Report (2 pages) for International Application No. PCT/US 07/10788 mailed Jul. 23, 2008.

Notification of Transmittal of the International Search Report and the Written Opinion of the International Search Authority, or the Declaration (3 pages); Written Opinion of the International Searching Authority (3 pages), and International Search Report (2 pages) for International Application No. PCT/US 07/13261 mailed Jul. 7, 2008.

Notification of Transmittal of the International Search Report and the Written Opinion of the International Searching Authority, or the Declaration (4 pages), Written Opinion of the International Searching Authority (3 pages), and International Search Report (2 pages) for International Application No. PCT/US07/17502 mailed Jul. 17, 2008.

Notification of Transmittal of the International Search Report and the Written Opinion of the International Searching Authority, or the Declaration (1 page), International Search Report (3 pages), and Written Opinion of the International Searching Authority (8 pages) for International Application No. PCT/US07/17503 mailed Sep. 16, 2008 (Total 12 Pages).

Examiner's First Report on Patent Application dated Jul. 23, 2008; (2 pages); and Correspondence from Australian Patent Office regarding withdrawal of Examination Report dated Jul. 23, 2008 (1 page); all issued in Australian Patent Application No. 2006326623 (3 pages total).

\* cited by examiner

ADMINISTRATOR CONFIGURABLE GADGET DIRECTORY FOR PERSONALIZED START PAGES

CROSS-REFERENCE TO RELATED APPLICATIONS

This application claims the benefit of U.S. Provisional Pat. Appl. No. 60/835,861, filed Aug. 7, 2006, which is incorporated by reference herein in its entirety.

BACKGROUND

1. Field of the Invention

The present invention relates to syndicated personalized start page(s) or content document(s) of a user group.

2. Related Art

A content document, such as a start page, can include a browser-based home page that can be accessed at an organization's domain (e.g., Web page) by a user using a workstation connected to a network such as the Internet, for example. A content document can be maintained by the content document provider or a group who has syndicated use of a content document, for example, and the content document can be customizable for a particular user or user group. For instance, groups, such as companies, universities, clubs, and organizations, can provide one or more content documents for their employees, customers, students, and/or members that focus on that group's particular interests. As an example, a company that sells computer equipment, such as personal or laptop computers, can integrate a default content document on their domain that appears upon connection to the Internet and that provides helpful tools, services, discussion boards, etc., that relate to a customer's purchased computer and/or interests.

Companies, such as Google Inc., frequently partner with such organizations and provide an appropriate syndicated default content document for a particular organization. The default content document may allow for some further customization at a group level (e.g., by an authorized representative of the group, such as an administrator), and may even allow some customization at a user level (e.g., adding modules or gadgets to the content document from a gadget directory). Some of this group-level or user-level customization can be conducted solely by the administrator or the user, without having to contact the content document provider. However, some items or tools that appear on a content document, or that are made available to appear on a content document, may only be customizable by contacting the content document provider.

Controlling the configuration of gadgets or modules (software tools or programs that are usually Uniform Resource Locater (URL)-based or Web-based) that can appear on, or that can be made available in, a content document is a task that is typically done through a group's (more specifically, a group's authorized administrator's) contact with the content document provider. An entire universe of modules, developed and submitted by both organizations and individuals, exists (and is growing), and these modules are, for the most part, available to anyone with access to the Internet. However, only a small number of modules are typically made available on default content documents. A user of a content document is then limited to this small number of available modules. In order for a group to customize (e.g., add to, delete from) the list of available modules, an administrator of the group may have to contact the content document provider (e.g., Google Inc.), and the content document provider would then make the updates in one or more files, for example, associated with that group's content document. This change would not be instantaneous and could take days to take effect.

Therefore, what is needed is a system and method that overcomes the above-described limitation(s).

BRIEF SUMMARY OF THE INVENTION

The present invention relates to the self-administrating of a group's syndicated content document customization. In an embodiment of the invention, a method of facilitating the self-administration of a directory of available modules on a group's syndicated customizable content document. The method includes presenting an initial list of modules to an administrator of a group, enabling the administrator to identify module selection information that identifies criteria for inclusion or exclusion of one or more modules in a directory, and storing the module selection information identified by the administrator. Accordingly, when a user of the group accesses a customized content document, the user is presented with a modified list of available modules based on the module selection information.

In an embodiment, a system to facilitate the self-administration of a directory of available modules on a group's syndicated customizable content document includes a content document editor. The content document editor presents an initial list of modules to an administrator of a group and enables the administrator to identify module selection information that identifies criteria for inclusion or exclusion of one or more modules in a directory. The system also includes a memory that stores the module selection information identified by the administrator. Accordingly, when a user of the group accesses a customized content document, the user is presented with a modified list of available modules based on the module selection information.

In a further embodiment, a method of self-administrating a directory of available modules on a group's syndicated customizable content document includes accessing a content document editor, reviewing an initial list of modules available to a particular group, modifying module selection information based on interests of the particular group, and submitting the modified module selection information. Accordingly, when a user of the group accesses a customized content document, the user is presented with a modified list of available modules based on the module selection information.

In further method or system embodiments, an administrator can be enabled to identify module selection information that identifies criteria for exclusion of one or more modules in a directory. Accordingly, when a user of the group accesses a customized content document, the user is presented with a modified list of available modules that excludes modules identified for exclusion.

In still further method or system embodiments, an administrator can be enabled to identify module selection information that identifies criteria for inclusion of one or more modules in a directory. Accordingly, when a user of the group accesses a customized content document, the user is presented with a modified list of available modules that includes only modules identified for inclusion.

In another embodiment of the invention, a system to facilitate the self-administration of a directory of available modules on a group's syndicated customizable content document includes a server maintained by a content document provider that has a content document editor. The system also includes a workstation, maintained by a user group and connected to the server via a network, that allows an administrator of the user group to access the content document editor. The content document editor presents an initial list of modules and enables the administrator to identify module selection information that identifies criteria for inclusion or exclusion of one or more modules in a directory. The system also includes a memory, maintained by the content document provider or the user group, to store the module selection information identified by the administrator. When a user of the user group accesses a content document customized in accordance with this system, the user is presented with a modified list of available modules based on the module selection information.

Advantages of the present invention include allowing partnered user groups the freedom to choose modules on their own from a wider selection without having to contact the content document provider. Additionally, a partnered user group can dynamically control what modules may appear or may not appear on their associated content document(s).

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIGS. 7A-7K depict screen shots related to the customization of a content document, according to embodiments of the present invention.

DETAILED DESCRIPTION OF THE INVENTION

Figure 1:
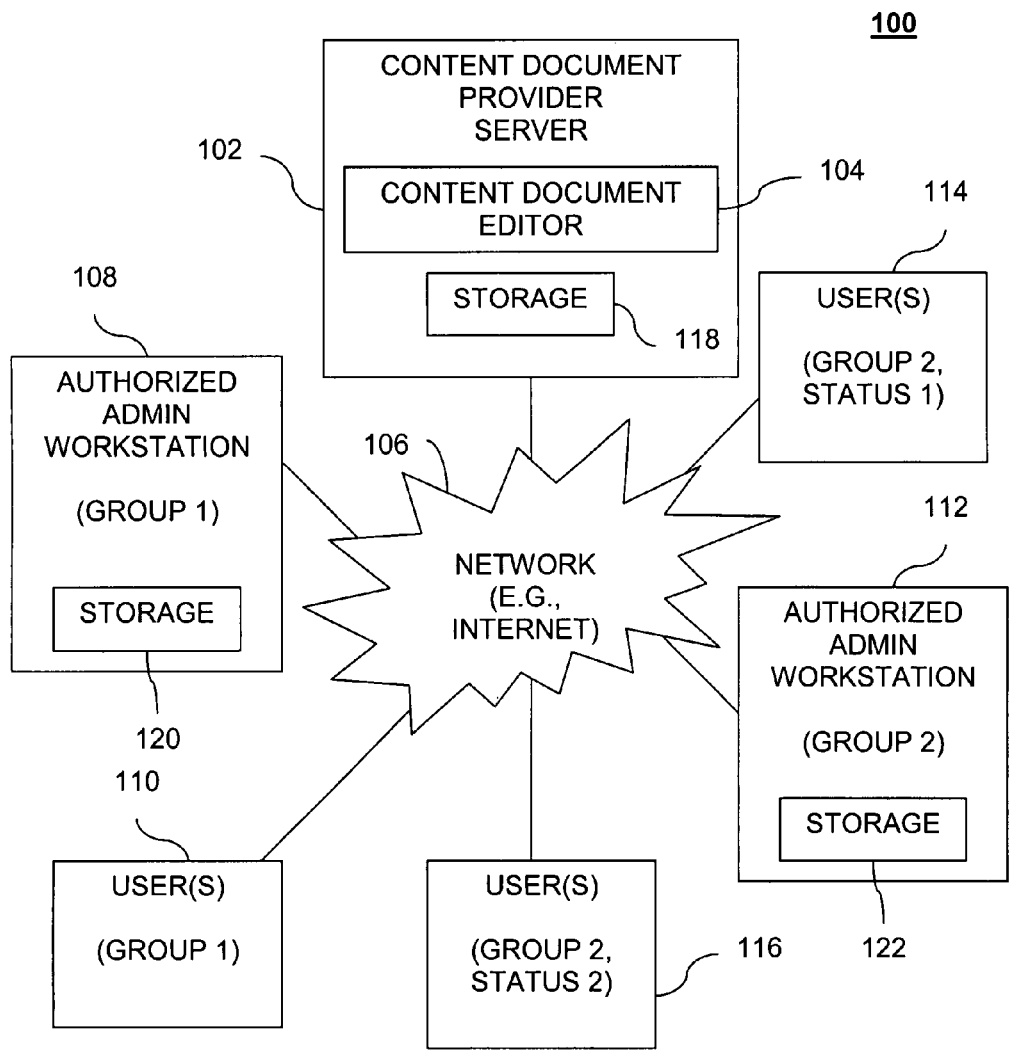
FIG. 1 is a simplified diagram of a system for self-administrating the customization of a group's syndicated content document or start page, according to an embodiment of the present invention.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic in connection with other embodiments whether or not explicitly described.

Overview

The present invention relates to the self-administrating of a group's syndicated content document customization. It specifically relates to dynamically effective self-configuration of a gadget or module directory by an administrator of a partnered user group. The present invention is described with respect to a World Wide Web environment operating on one or more networks, such as the Internet. Such an environment is illustrative and not intended to limit the present invention.

The embodiments described herein illustrate systems and methods that allow an administrator of a particular partnered user group to self-configure the directory of modules available to users of the group on that group's content document or start page. The administrator can allow access to all available modules universally available, or can restrict the modules available on the content document in a number of ways described herein. The changes in the module directory submitted directly by the administrator take effect immediately. Therefore, there is no administrative delay that would typically occur if changes had to be made via a request to a content document provider.

A more specific example of this can be described as follows. An Internet Service Provider (ISP) wishes to offer a personalized start page to its users. The personalized start page would be equivalent to the content document, and the ISP would be equivalent to the partnered user group, as these terms are used in this document. The personal start page can be customizable by the users in the sense that users can add their own chosen gadgets (or modules) to the start page from a designated gadget (or module) directory. The ISP (or more specifically, an administrator of the ISP) can configure the gadget directory by restricting certain gadgets from a global gadget list (also known as blacklisting) or by specifying a distinct set of gadgets that will appear (also known as whitelisting). Blacklisting gadgets will allow the ISP to block competitive gadgets or gadgets that do not adhere to the ISP's policies. Whitelisting gadgets will allow the ISP to fully control which gadgets are discoverable by users. Furthermore, the ISP can highlight gadgets of relevance to their users by designating a custom gadget category in the directory that users will see when they add content to their start pages. This custom category can include gadgets that the ISP has created, or can simply include any gadgets that the ISP recommends to its users.

The following invention description facilitates the above example. The description is broken down into a system architecture, process embodiments, and example implementation(s).

System Architecture

FIG. 1 is a simplified diagram of a system 100 for self-administrating the customization of a group's syndicated content document or start page, according to an embodiment of the present invention. System 100 can include a server 102 maintained by the content document provider. Server 102 can include one or more computers that can include hardware and/or software components typical of a server. Server 102 can include a content document editor 104 that can be used to customize a group's syndicated content document. Content document editor 104 can be accessible to authorized entities over a network 106, such as the Internet. Storage 118 (such as a memory) can be available on server 102 (or possibly on another device maintained by the content document provider (not shown)) to store data that may be associated with the customization of various groups' content documents.

System 100 also includes one or more workstations 108/112, each maintained by a partnered user group, for example, that is connected to network 106. Although two workstations 108/112 are shown (one for an administrator of a first partnered user group (Group 1) and one for an administrator of a second partnered user group (Group 2), the invention is not to be limited to two. Any number of these workstations can exist in the system, for any number of groups, as would be understood by those skilled in the relevant art(s).

An administrator of a partnered user group can use workstation 108/112 to access content document editor 104 via network 106. For authorization purposes, an authorized administrator may log into server 102 using a user name and password, for example. Once logged in, the authorized administrator can access content document editor 104 to customize one or more of that group's syndicated content documents, including the configuration of one or more module or gadget directories. Workstation 108/112 can include storage 120/122 (e.g., memory) to store data that may be associated with the customization of the corresponding groups' content document(s).

Content documents (and any associated data, including customization data) are typically stored on server 102 (in storage 118, for example). However, a content document (and/or its associated data) can be stored at a location maintained by its associated group, such as storage 120/122, or elsewhere.

Users 110/114/116 of a partnered user group can access their associated group's content document(s) via network 106. For example, a Group 1 user 110 may enter the URL of the content document in an Internet browser on a personal computing device, to include, but not be limited to a personal computer, laptop, personal digital assistant (PDA), mobile telephone, or the like. Alternatively, user 110 may be connecting a purchased product (such as any of the personal computing devices just mentioned, for example) to the Internet for the first time. In this situation, a default content document for Group 1 may be automatically accessed in an Internet browser. The first time user 110 accesses Group 1's content document, it will appear in a default form, as set up by the content document provider, or alternatively in a customized default form as may have been already customized by an authorized administrator. User 110 may be able to further customize the content document to his or her liking, within limits as designated within the content document.

A partnered user group, such as Group 1, typically has one content document that it makes available to its users, such as users 110. However, it is possible for a partnered user group to have more than one content document. For example, a partnered user group may have a content document for its customers or members, and another content document for its employees. As another example, a partnered user group may have differing levels of members. For instance, a company may have differing levels of customers, such as an occasional customer, a frequent customer, and a VIP customer. The content document accessed by each type of customer can be tailored for that particular type of customer. Using FIG. 1 as an example, user 114, who is a member of Group 2 with a status of "1" (this status indication used for purposes of this simplified example only and not to imply a detail of actual implementation), may represent an occasional customer (e.g., a new customer or a customer who does not have an account set up with the company associated with Group 2). When user 114 accesses a Group 2 content document, it may be a default content document. However, user 116, who is also a member of Group 2, but has a status of "2", may represent a VIP customer (e.g., a customer who is very frequent purchaser and who has an account set up with the company associated with Group 2). When user 116 accesses a Group 2 content document, user 116 may be recognized as a VIP customer (e.g., based on a user name and password or a recognized IP address or Internet cookie) and may be directed to a special content document just for VIP customers (e.g., one that includes special offers or privileges not offered to customers of lower status).

In a related example, both users 114 and 116 may first be presented with a default content document, but once each identifies him or herself (e.g., via a user name and password or by indicating that he or she does not have an account), each may be presented with a different content document customized for his or her particular status.

In yet another related example, both users 114 and 116 may be presented with a common basic content document. However, the customization of that content document may be different based on each user's particular status. It is also possible for a single user to have multiple statuses apply, which can also affect how a content document is customized for that particular user. This could be, for example, based on the combination of surveyed interests for a particular user.

The examples described in the previous paragraphs are to show that a partnered user group is not limited to a single content document. A partnered user group can have, for example, more than one content document, each based on member type or user status, or a single content document that is customized based on user status. The content available on a content document, including the configuration of one or more gadget or module directories, can be customized by an authorized administrator, which can be based on member type or user status, for example, as will be discussed in more detail further below.

A more detailed description of the system architecture, including a more detailed description of a content document, or start page, can be found in co-pending U.S. Provisional Pat. Appl. No. 60/835,861, filed Aug. 7, 2006, which is incorporated by reference herein in its entirety.

Process Embodiments

Figure 2:
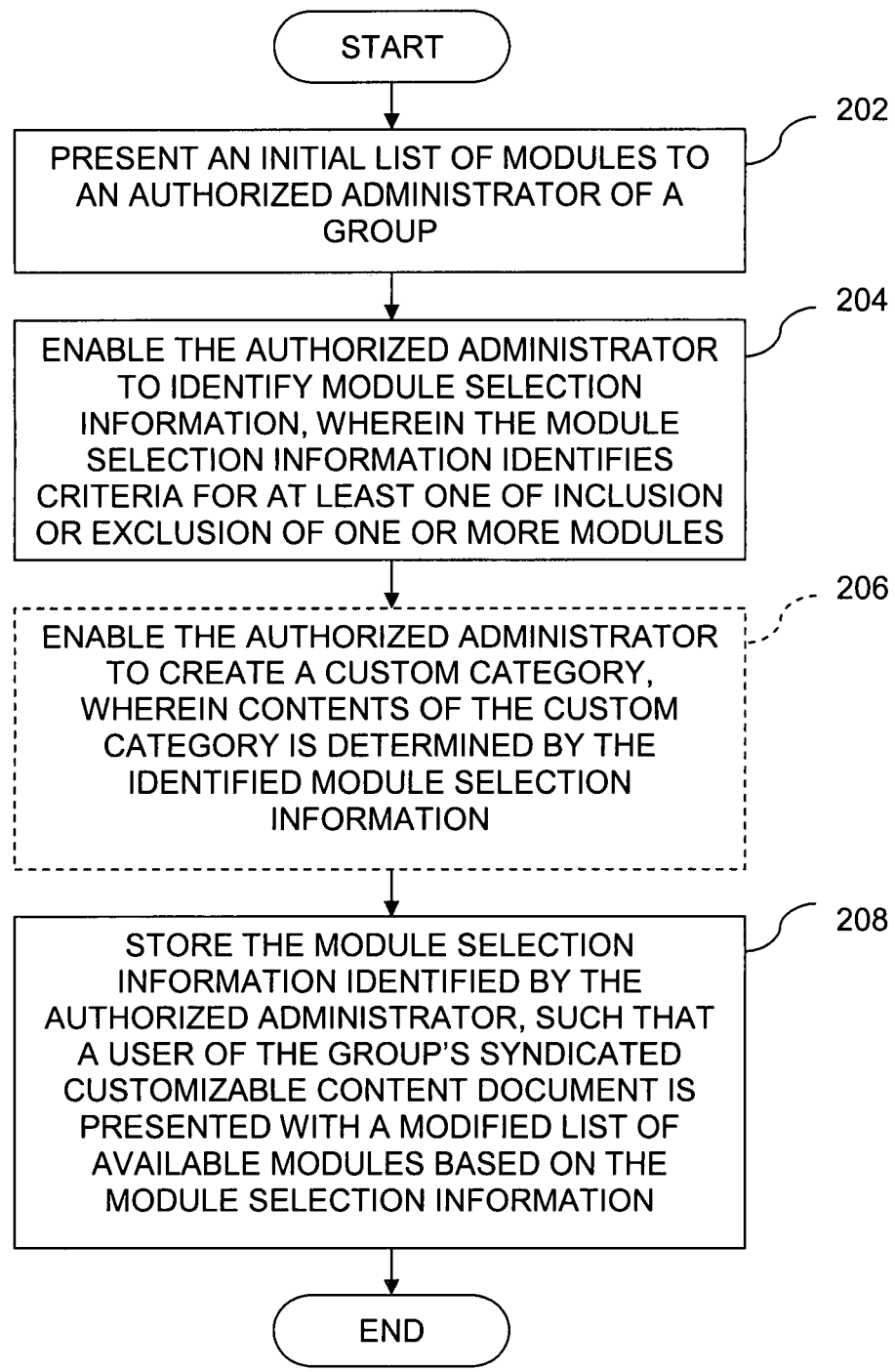
FIG. 2 is a flowchart depicting a method of facilitating the self-administration of a directory of available modules on a group's syndicated customizable content document from the perspective of the customization tool, according to an embodiment of the present invention.

FIG. 2 is a flowchart of a method 200 of facilitating the self-administration of a directory of available modules on a group's syndicated customizable content document, according to an embodiment of the present invention. Method 200 is primarily from the perspective of the tool used to conduct it. The tool can be, for example, a Web-based or browser-based content document editor, or alternatively can be a software-based content document editor, that works over a network such as the Internet. For example, an authorized administrator can access content document editor 104 from workstation 108/112 as shown in FIG. 1. The tool can be displayed for the authorized administrator in a window or browser shown on a monitor of workstation 108/112, for example.

Method 200 begins at step 202. In step 202, an initial list of modules (or gadgets) is presented to an administrator of a group. This initial list can be a global list of all available modules, for example. Alternatively, the initial list can be presented based on a search of modules conducted by the administrator. As another alternative, the initial list can be presented based on a category chosen by the administrator. Accordingly, the initial list may be an unbounded (universal or global) list of available modules, or the initial list may be a bounded list of available modules. As another alternative, the initial list may also include categories, with each category representing a subset of modules.

In step 204, the administrator is enabled to identify module selection information that identifies criteria for the inclusion or exclusion of one or more modules. For example, corresponding to each listed module (or category) may be a toggle button, a checkbox, a radio button, or the like, that can be used by the administrator to indicate inclusion or exclusion. In addition, a means for submission of the module selection information can be available to the administrator. For example, a submit button or instructions for submitting the module selection information (e.g., instructions to press a certain key on a keyboard (such as "Enter") when complete).

In optional step 206, the administrator is enabled to create a custom category. The contents of the custom category can be determined by the module selection information identified in step 204. A custom category can allow the administrator to highlight modules of relevance to the users. This custom category may include modules that are authored by the group (i.e., the organization that the group represents) or any modules that the group recommends to its users.

In step 208, the module selection information identified by the administrator is stored. It can be stored in storage 118 (e.g., a memory), or another storage area that is maintained by the content document provider, for example. Or alternatively, it can be stored in storage 120 or 122, maintained by a partnered user group.

Step 208 can include storing module indicators (such as URLs, module names, or other module identifiers, for example) that represent modules selected for exclusion. These can be stored in an exclusion list, for example, which can be considered as a blacklist. When a user accesses a group's content document, the user is presented with a list of available modules excluding modules listed in the exclusion list. The purpose of this is to allow a user to have any module available to him or her (as defined by the group), except those listed on the exclusion list. As an example, if Group 1 represents Computer Company A, then a Group 1 administrator may add modules having to do with competitor Computer Company B to the exclusion list so that they are not available to users of Group 1 upon accessing an associated content document.

It is also possible to have multiple exclusion lists stored for a particular group. For example, in the case where a group has users of differing status, a different exclusion list may be used for each status of user. As another example, a group may have users who each are of multiple statuses (e.g., based on a survey of the users' particular interests). In this example, multiple exclusion lists may apply to a single user based on one or more of the user's chosen interests. (For example, a user A who is interested in riding Brand X motorcycles in Europe may have two exclusion lists apply to him or her that exclude modules that have to do with other brands of motorcycles and that exclude modules that have to do with other countries. Whereas, a user B who is interested in riding Brand X motorcycles anywhere, may have just the exclusion list apply to him or her that only excludes modules that have to do with other brands of motorcycles.)

Step 208 can include storing module indicators (such as URLs, module names, or other module identifiers, for example) that represent modules selected for inclusion. These can be stored in an inclusion list, for example, which can be considered as a whitelist. When a user accesses a group's content document, the user is presented with a list of available modules including only modules listed in the inclusion list. The purpose of this is to limit the modules available to a user on a content document to only those that are in the inclusion list. As an example, a group may want to limit modules to only those relevant to a specific country, language, origin, operating system, product, etc.

It is also possible to have multiple inclusion lists stored for a particular group. For example, in the case where a group has users of differing status, a different inclusion list may be used for each status of user. As another example, a group may have users who each are of multiple statuses (e.g., based on a survey of the users' particular interests, as discussed above). In this example, multiple inclusion lists may apply to a single user based on one or more of the user's chosen interests. However, a decision may have to be made by a particular group, or the group's administrator, whether to allow a combination of the inclusion lists apply to a particular user, or the intersection of the inclusion lists.

It may also be possible to have one or more inclusion lists and one or more exclusion lists apply to a user, depending on the user's status or statuses. For example, one or more inclusion lists may be applied to a user, as discussed above. However, one or more exclusion lists may then be applied. Whether a group uses one or more inclusion lists, one or more exclusion lists, or both, depends on the desires and/or needs of the group.

Method 200 ends after step 208. Once the module selection information is submitted and stored, the changes immediately take effect in an accessed content document. The administrator can re-access the content document editor and make further changes as the need arises.

Figure 3:
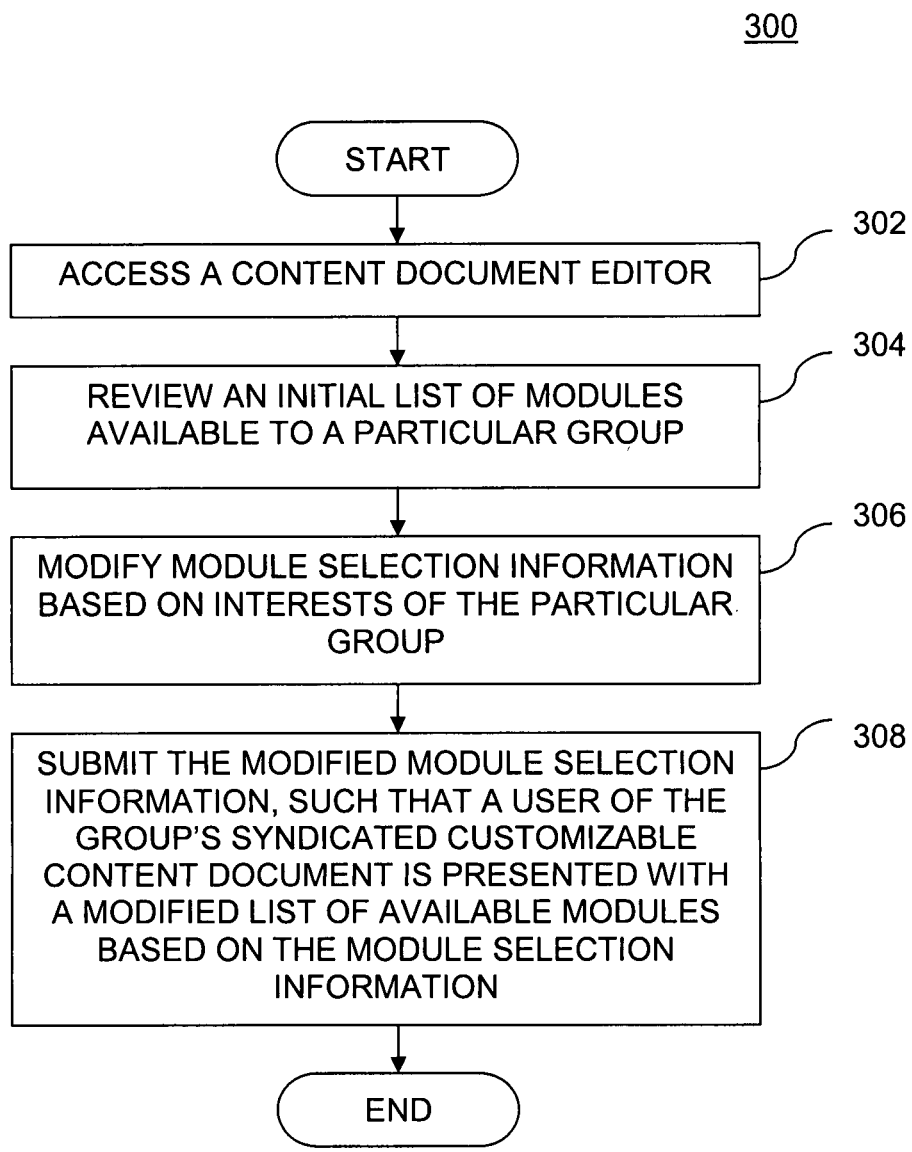
FIG. 3 is a flowchart depicting a method of facilitating the self-administration of a directory of available modules on a group's syndicated customizable content document from the perspective of the group's administrator, according to an embodiment of the present invention.

FIG. 3 is a flowchart depicting a method 300 of facilitating the self-administration of a directory of available modules on a group's syndicated customizable content document, according to an embodiment of the present invention. Method 300 is similar to method 200. However, it is from the perspective of the group's administrator.

Method 300 begins at step 302. In step 302, a content document editor is accessed. As discussed earlier, this may be accomplished by logging into server 102 with a user name and password, for example. In step 304, an initial list of modules available to a particular group is reviewed. In step 306, module selection information is modified based on interests of the particular group. In step 308, the modified module selection information is submitted. Method 300 then ends. Once the modified module selection information is submitted (and subsequently stored), a user accessing that group's content document is presented with a modified list of available modules based on the module selection information. As stated earlier, once the module selection information is submitted and stored, the changes immediately take effect in an accessed content document. The administrator can re-access the content document editor and make further changes as the need arises.

Figure 4:
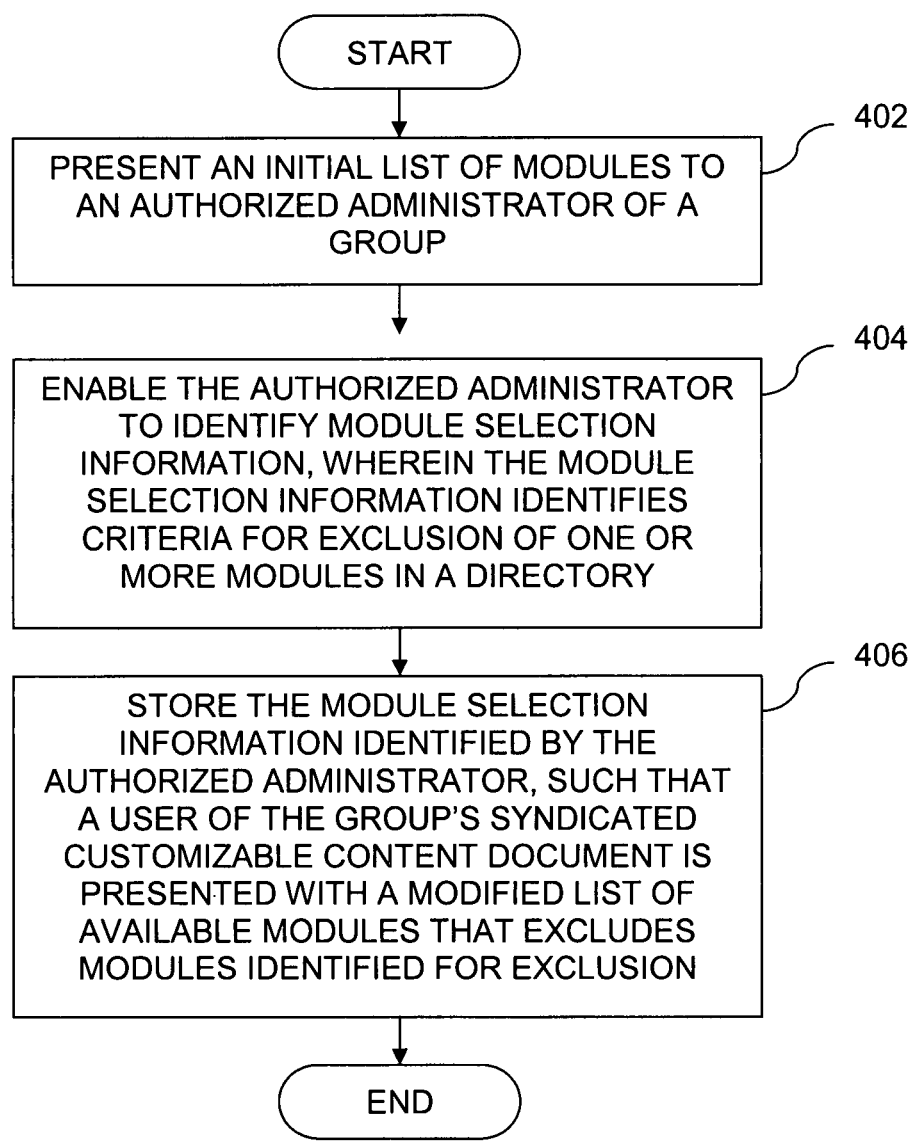
FIG. 4 is a flowchart depicting a method of facilitating the self-administration of a directory of available modules on a group's syndicated customizable content document with a focus on module exclusions, according to an embodiment of the present invention.

FIG. 4 is a flowchart depicting a method 400 of facilitating the self-administration of a directory of available modules on a group's syndicated customizable content document, according to an embodiment of the present invention. Method 400 is similar to method 200. However, it focuses on module exclusions.

Method 400 begins at step 402. In step 402, an initial list of modules is presented to an administrator of a group. In step 404, the administrator is enabled to identify module selection information that identifies criteria for exclusion of one or more modules in a directory. In step 406, the module selection information identified by the administrator is stored. Method 400 then ends. Once the modified module selection information is stored, a user accessing that group's content document is presented with a modified list of available modules that excludes modules identified for exclusion.

Figure 5:
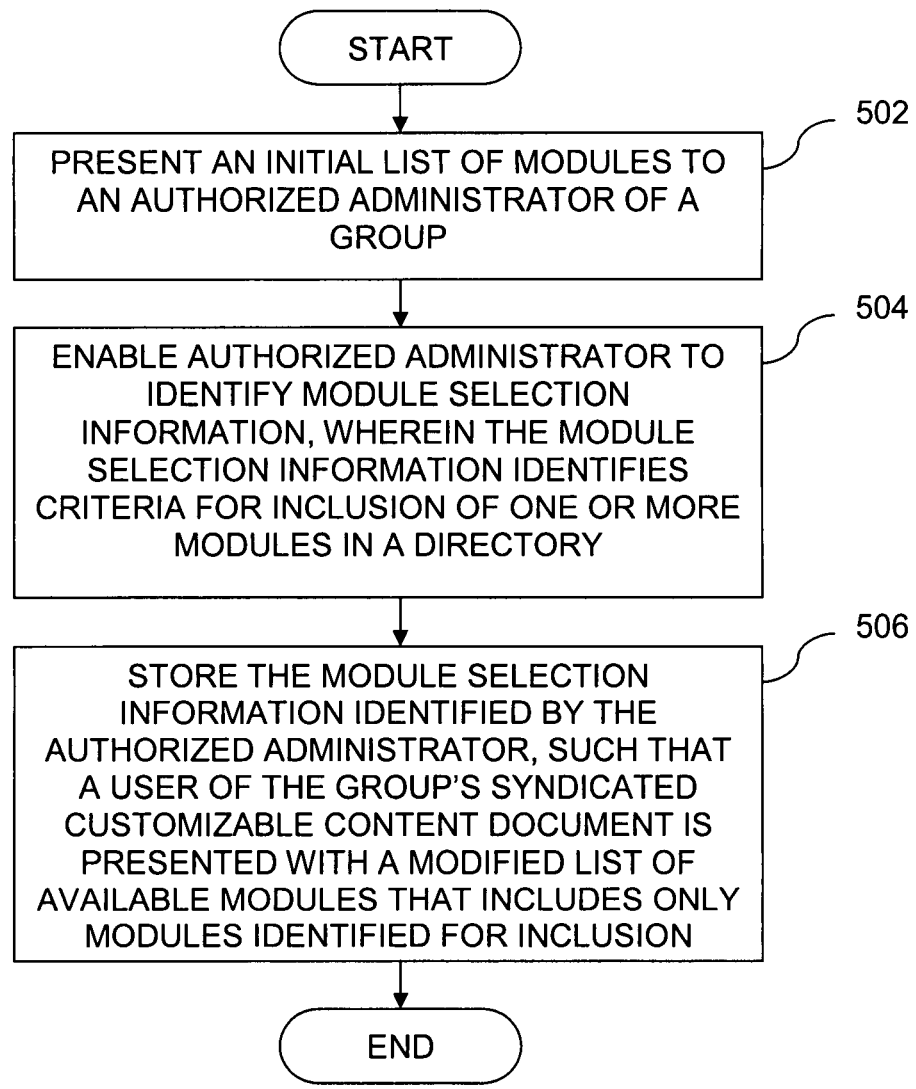
FIG. 5 is a flowchart depicting a method of facilitating the self-administration of a directory of available modules on a group's syndicated customizable content document with a focus on module inclusions, according to an embodiment of the present invention.

FIG. 5 is a flowchart depicting a method 500 of facilitating the self-administration of a directory of available modules on a group's syndicated customizable content document, according to an embodiment of the present invention. Method 500 is also similar to method 200. However, it focuses on module inclusions.

Method 500 begins at step 502. In step 502, an initial list of modules is presented to an administrator of a group. In step 504, the administrator is enabled to identify module selection information that identifies criteria for inclusion of one or more modules in a directory. In step 506, the module selection information identified by the administrator is stored. Method 500 then ends. Once the modified module selection information is stored, a user accessing that group's content document is presented with a modified list of available modules that includes only modules identified for inclusion.

Example Implementation(s)

Figure 6:
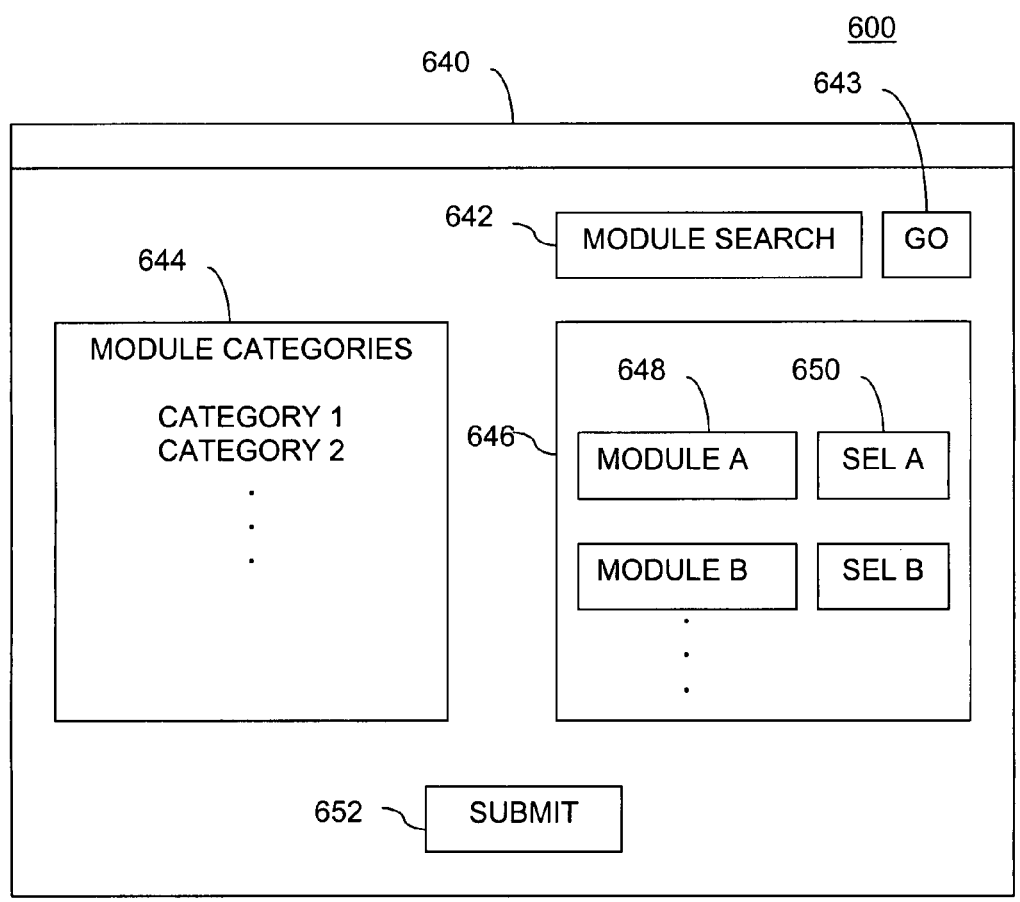
FIG. 6 depicts a simplified screen shot of a content document editing tool, according to an embodiment of the present invention.

FIG. 6 depicts a simplified screen shot 600 of a content document editing tool, according to an embodiment of the present invention. Screen shot 600 includes a window 640. Window 640 can represent an Internet browser window in which an administrator has accessed content document editor 104 from administrator workstation 108 or 112 over network 106 (from FIG. 1), for example. Alternatively, window 640 can represent a window generated by software launched on administrator workstation 108 or 112 that has accessed content document editor 104 over network 106.

Window 640 can include various sections, including module search field 642, module category list 644, and module list 646. In one embodiment, an administrator for a group can enter search terms related to certain types of modules in module search field 642, hit search button (e.g., "Go" button) 643, and view a resulting list of matching modules in module list 646. Alternatively, the administrator can choose one or more categories in module category list 644 and view corresponding modules from those categories in module list 646. From module list 646, the administrator can choose one or more modules (for example Module 648 (MODULE A)) by using selection means 650 (SEL A). Selection means 650 can be any selection mechanism that can be used in a window such as window 640, such as a toggle button, a checkbox, a radio button, etc. When the administrator is ready to submit the selections, submit means 652 can be used to do so. Submit means 652 can include a submit button, a set of instructions (such as instructions to "Hit ENTER When Complete"), or the like. Screen shot 600 shows only one example of a window 640 that can be used to configure a module directory for a partnered user group. It would be understood by those skilled in the relevant art(s) that there are many other ways for window 640 to work, and that there are many other ways that window 640 can be configured to accomplish the same goal. For example, a window 640 can include two columns: a first column that lists all available modules, and a second column that lists those items chosen from the first column for inclusion or exclusion. When dealing with multiple user statuses, an even more involved window 640 can be used.

In the above examples, only one window 640 is used to configure a module directory. However, more than one window 640 can be used. For example, one or more windows 640 can be used to create one or more inclusion lists. Similarly, one or more windows 640 can be used to create one or more exclusion lists. In another alternative example, one window 640 can be used to create an inclusion list, and one or more windows 640 can be used to create exclusion lists for each type of user in the group. There are many possible ways that a content document editor can be used, as would be understood by those skilled in the relevant art(s) with knowledge of this disclosure. Examples of content document editor screens that can be used to carry out content document customization according to embodiments of the present invention are shown in FIGS. 7A-7K.

Figure 7A:
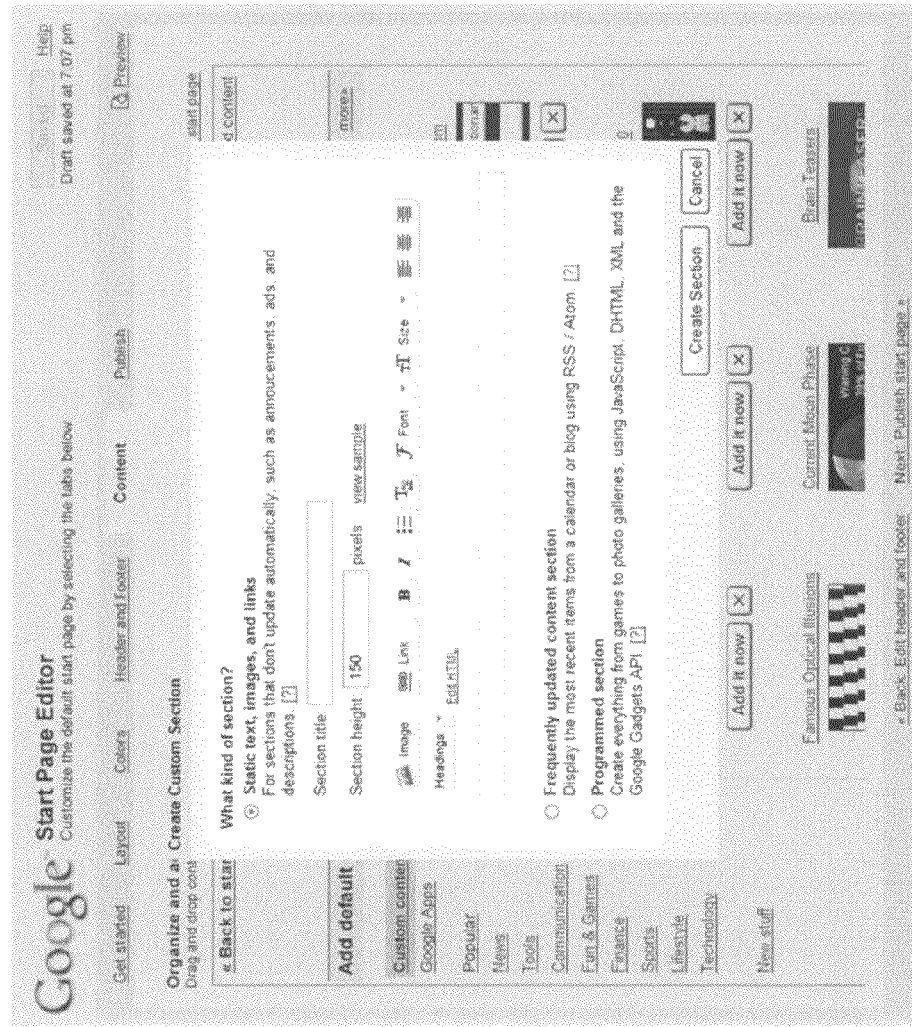

FIG. 7A depicts an example screen within a content document (i.e., start page) editor that can be accessed by an administrator of a partnered user group, for example, to customize a default content document for that group. For example, as can be seen from the bar below the title bar, an administrator can customize the layout, colors, header and footer, and content. The sub-window shown on the screen of FIG. 7A shows that a custom section can be created.

FIG. 7B depicts an example screen within a content document editor that shows a layout of various sections of a content document, as can be viewed by an administrator while working within the content document editor. As can be seen in FIG. 7B, some areas can be "locked" to prevent further customization by users (see "Locked column"), while other areas allow further customization by users (see "User-customizable columns").

Figure 7C:
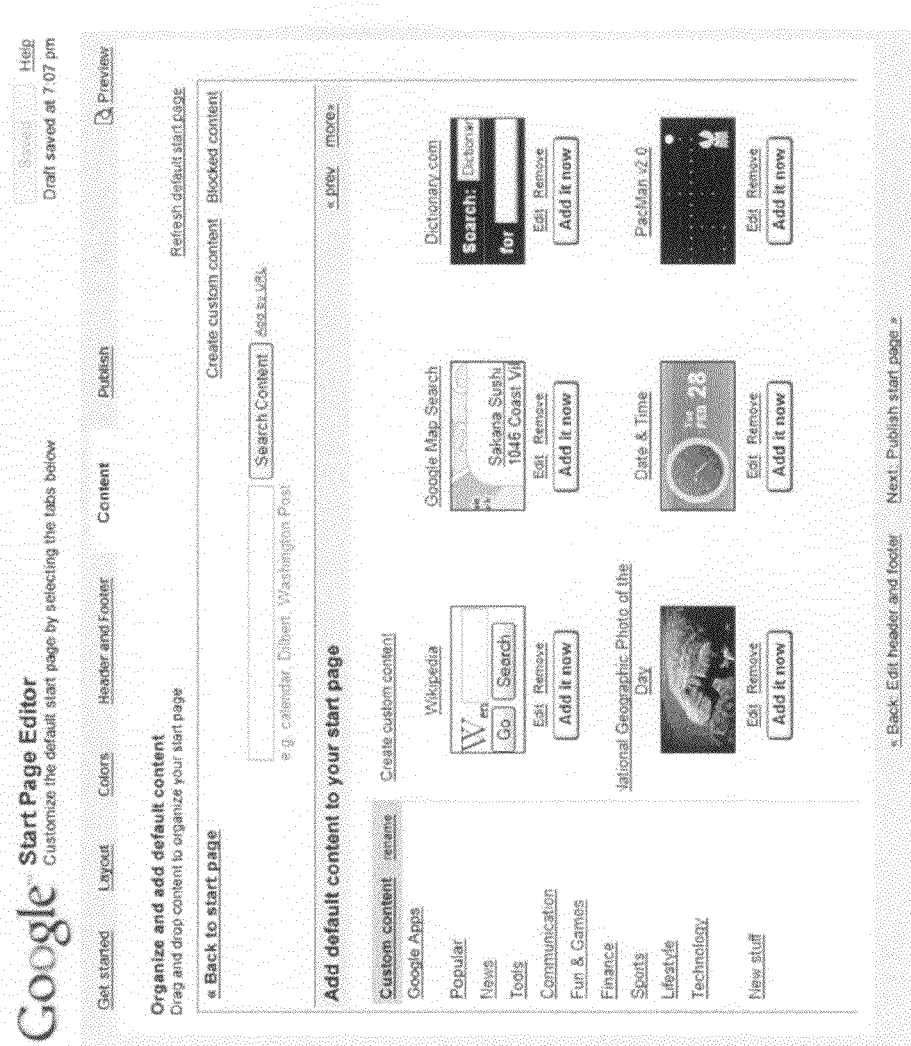

FIG. 7C depicts an example screen within a content document editor that represents an example of content that can be added to a default content document by an administrator, or that can be made available by an administrator for users to further customize a content document. Already existing modules (gadgets) can be added, or modules can be created or customized (for a particular location, for example). A screen such as this screen may also be used to create a custom category of modules recommended by an administrator for use by users. Alternatively, a screen such as this may be used to create an inclusion list (or white list) by "adding" modules that you want to appear in a module directory.

Figure 7D:
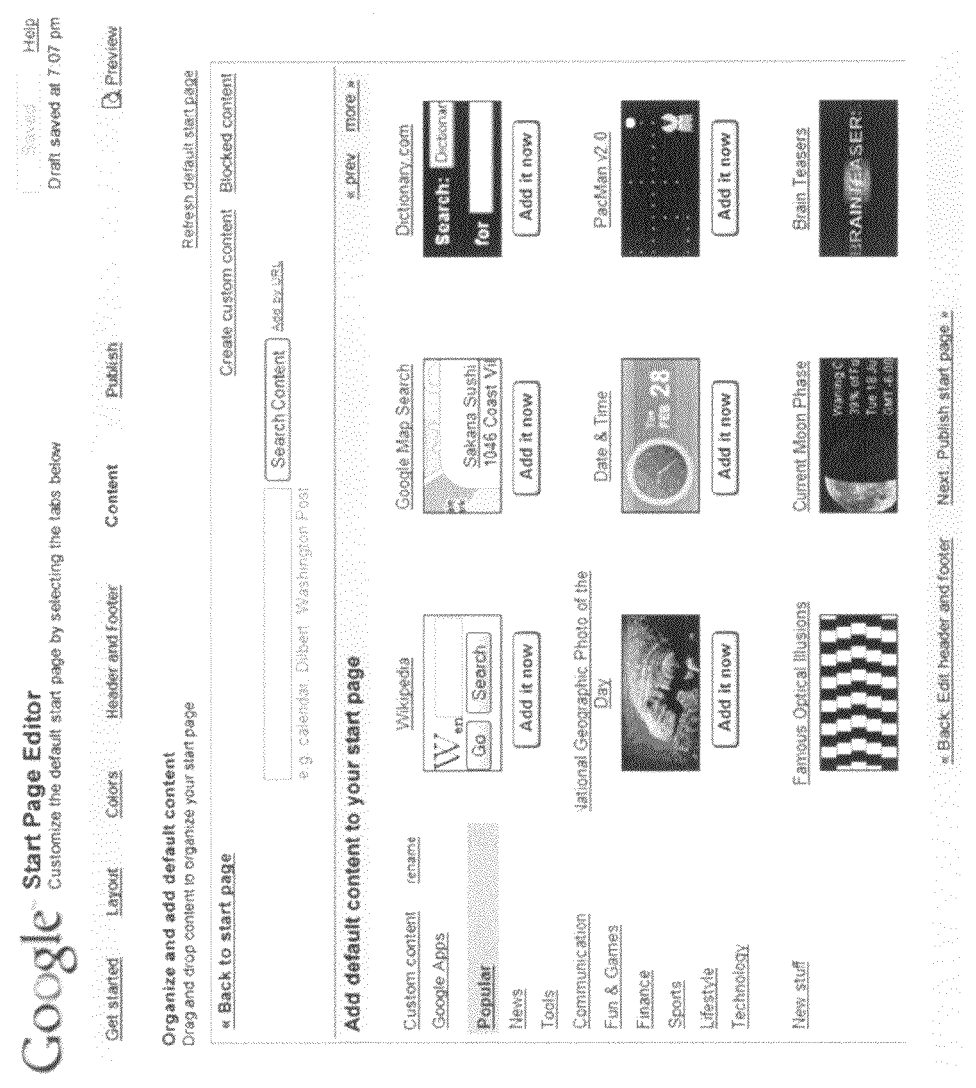

FIG. 7D depicts an example screen from which an administrator can choose a category (e.g., "Popular" modules) from which he or she can choose modules to add to a default content document. A module can be added by clicking on the corresponding "Add it now" button, for example.

Figure 7E:
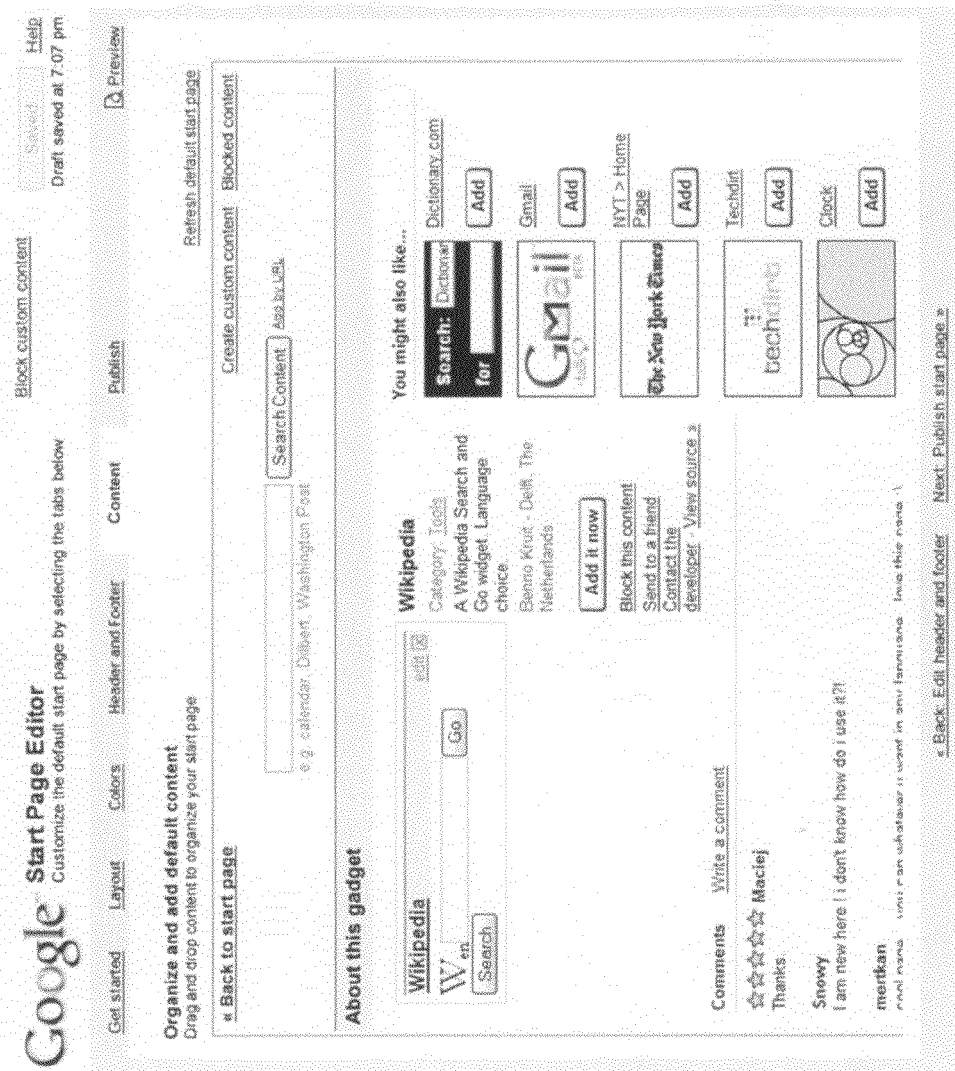
Figure 7F:
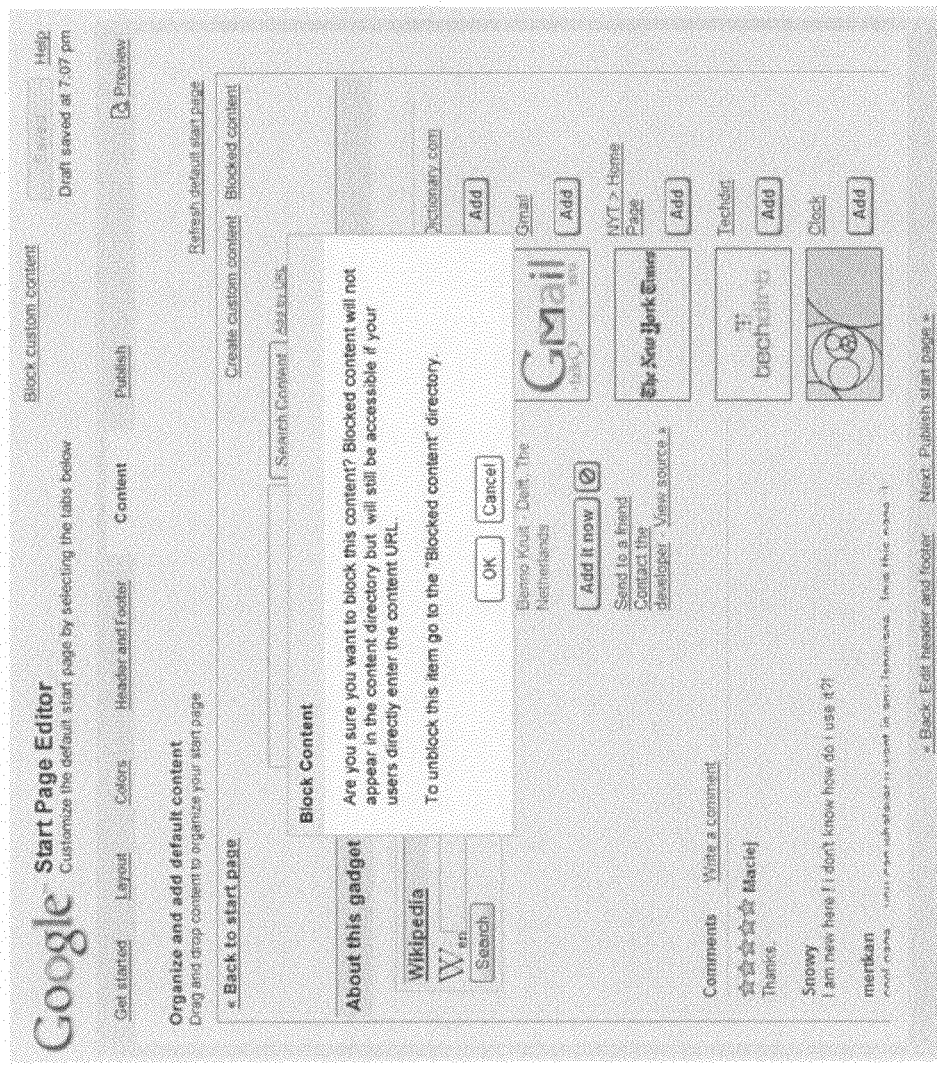
Figure 7G:
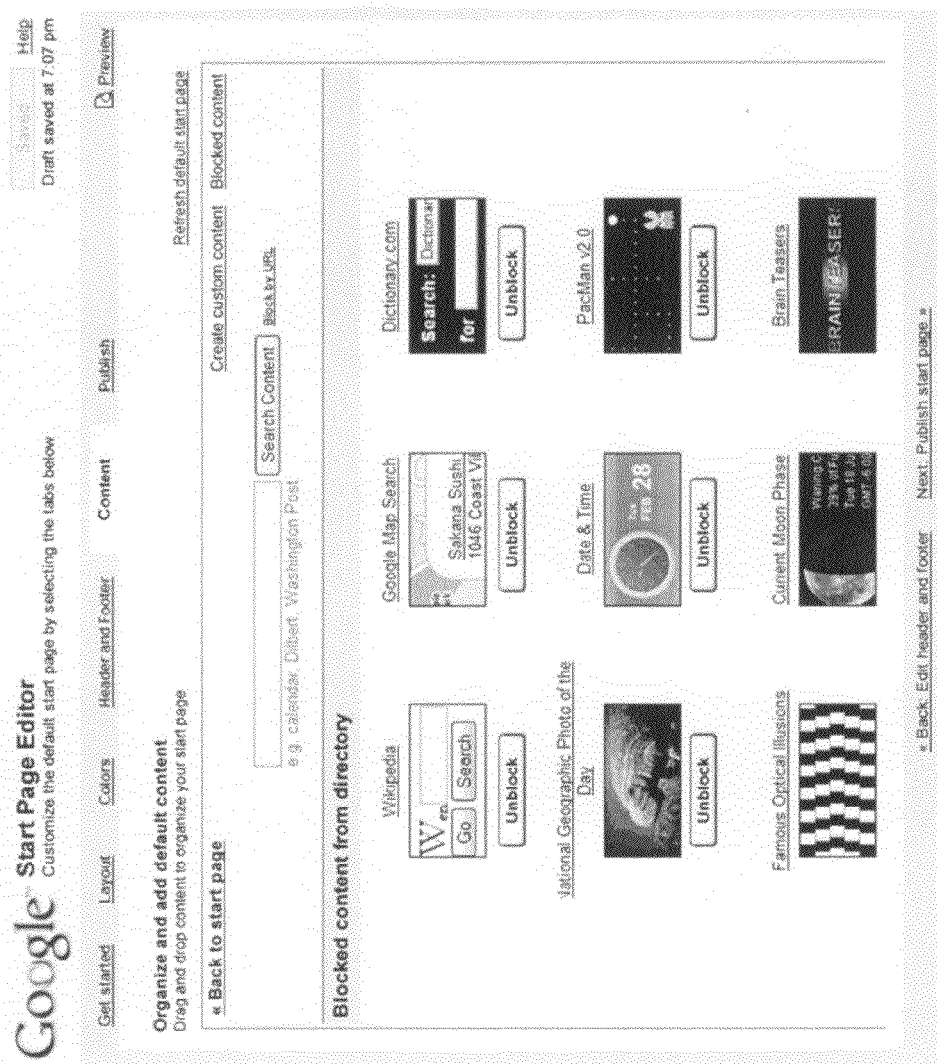

FIG. 7E depicts an example screen showing what one may see when one of the listed module titles from FIG. 7D is chosen, for example. FIG. 7E shows an example screen presented when module "Wikipedia" is chosen. Some further information about the chosen module can be displayed, such as its purpose, its creator, user comments, and/or similar, related, or popular modules that a user of this module may like to use, for example. From this screen, it can be possible for an administrator to add it to a default content document (by clicking on the corresponding "Add it now" button, for example) or block the module from appearing in a directory to be shown to users of an associated content document. Blocking this module can be accomplished by clicking on "Block this content" from this screen, for example. A confirmation dialog box may then appear to have the administrator confirm that this module is to be blocked, as shown in FIG. 7F. Blocking is equivalent to creating an exclusion list, as described earlier in this document (i.e., blacklisting), which will prevent a module from appearing in the module directory presented to users of an associated content document. Blocked modules can be unblocked by an administrator from a list of blocked content, such as that shown in FIG. 7G. For example, if an administrator has blocked module "Wikipedia," the administrator can unblock it by clicking on the associated "Unblock" button as shown, for example, in FIG. 7G.

Figure 7H:
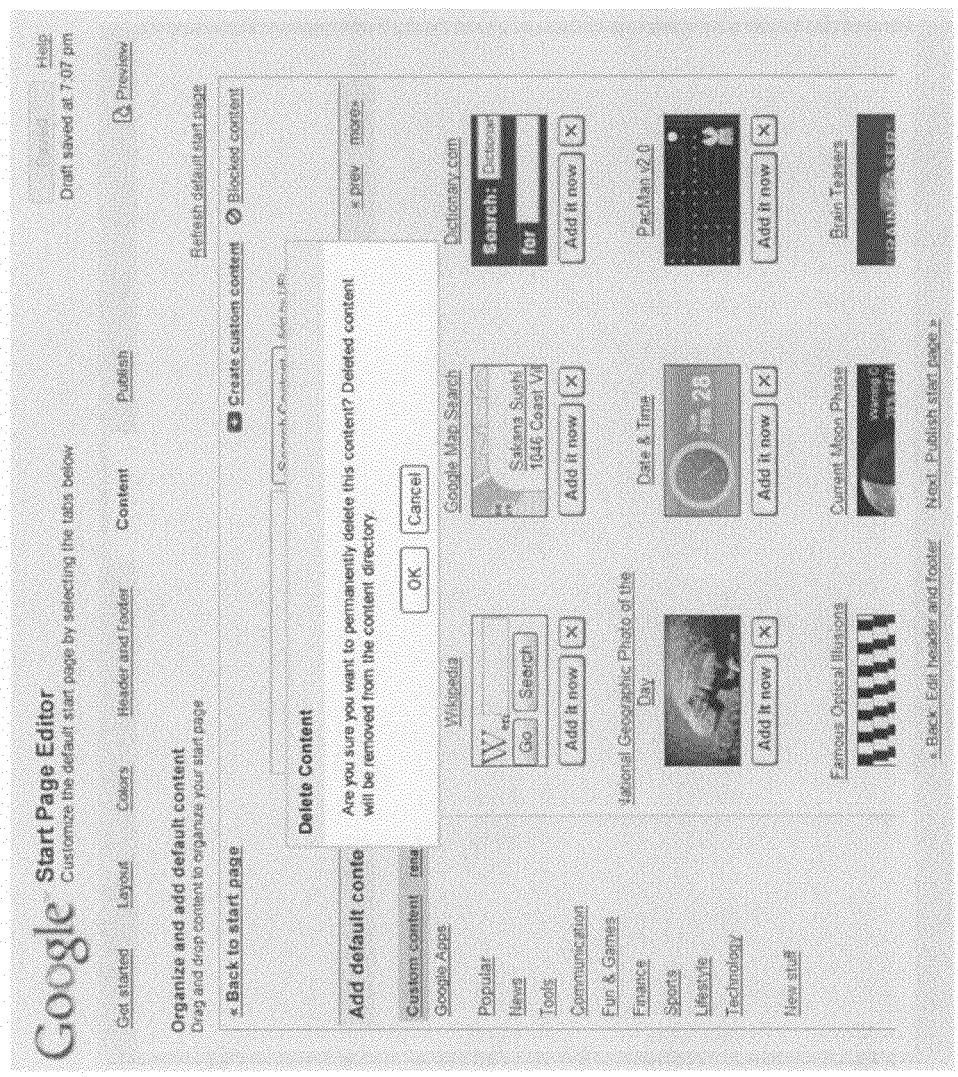
Figure 7J:
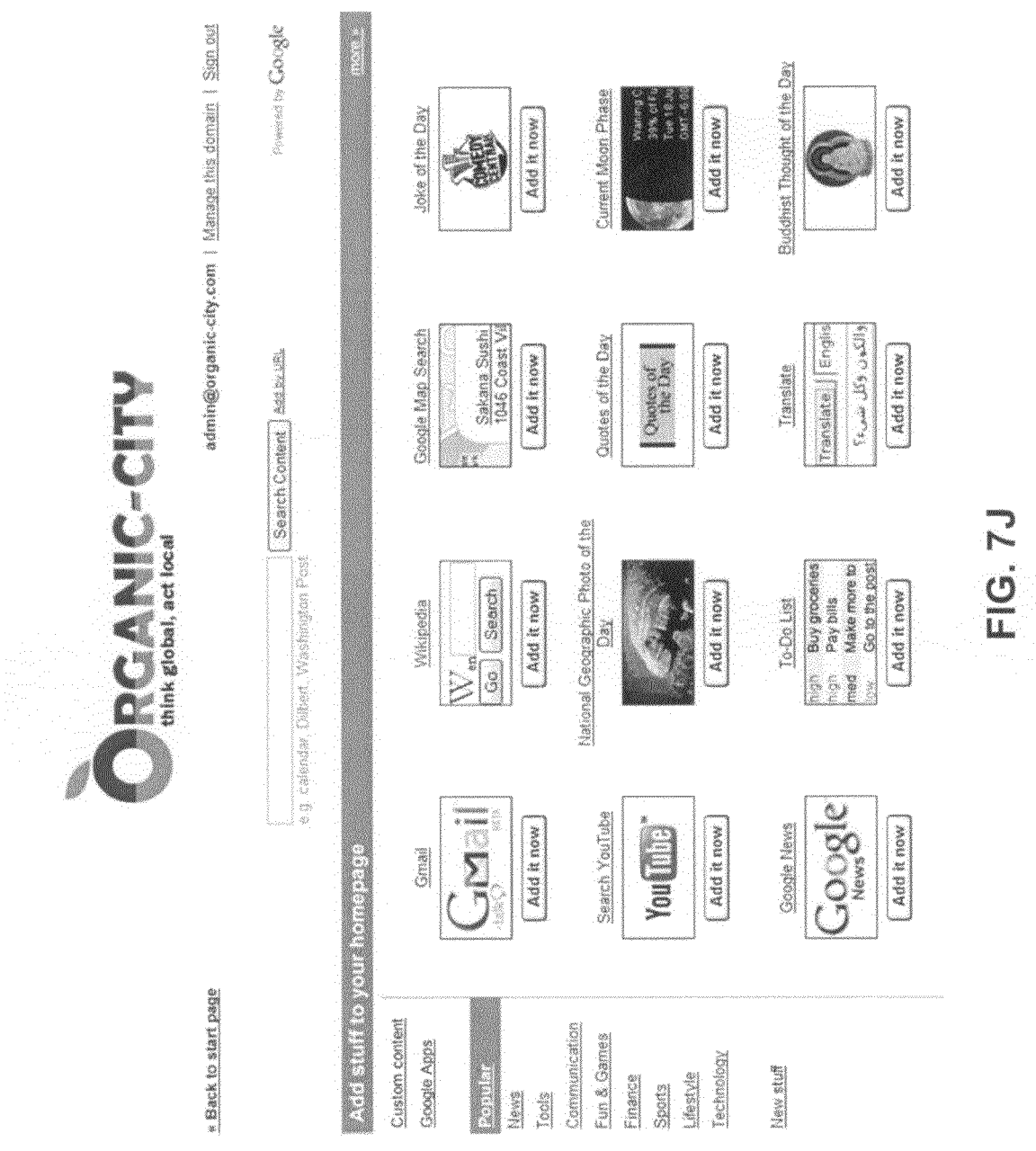

FIG. 7H depicts an example screen within a content document editor that can allow an administrator to delete a module from a module category (such as a custom category created by the administrator, for example) or from the entire directory. An administrator may delete a module by clicking on a delete button associated with that module, for example, such as one of the delete buttons shown with an "X" for each listed module on FIG. 7H. A confirmation dialog box may then appear to have the administrator confirm that this module is to be deleted, as shown in the sub-window of FIG. 7H. A screen such as the screen shown in FIG. 7H may be used to create an inclusion list (or white list) by "deleting" modules that are not to appear and leaving the modules that are to appear in a module directory.

Figure 7K:
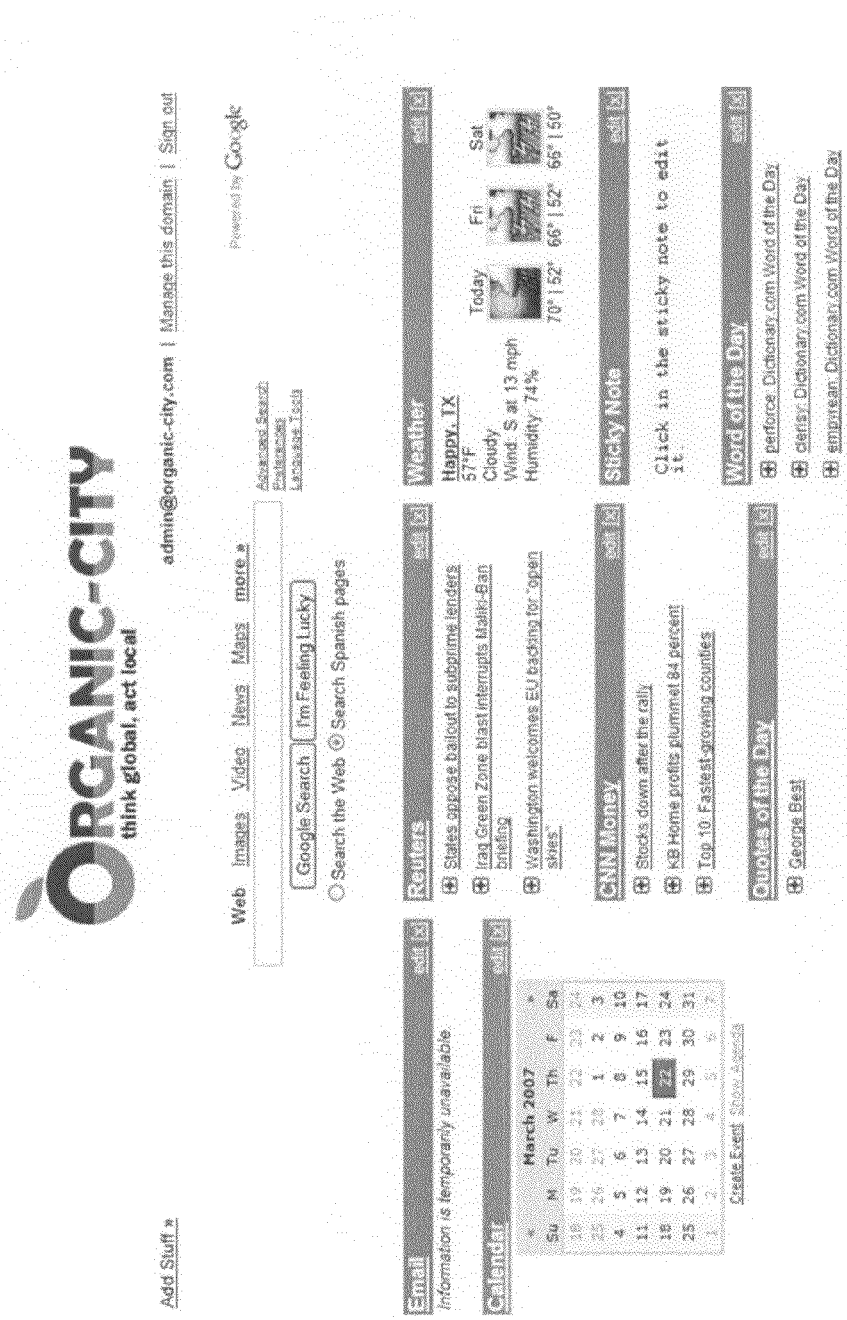

FIG. 7I depicts an example content document. For example, it could represent a default content document as set up by a group's administrator. A user accessing this content document can customize the document by adding modules. For example, a user can add a module by clicking on "Add Stuff" in the top left corner of the screen. The resulting screen may be similar to that shown in FIG. 7J, which depicts a list of modules in the "Popular" category that can be added by a user to the user's content document. For example, the user can choose a module or functionality he or she would like to add by clicking on the "Add it now" button associated with the chosen module. For example, a user may have been able to add in this manner the additional functionality surrounding the Google Search field toward the top of the screen as shown in FIG. 7K.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computer-implemented method of facilitating the self-administration of a directory of available modules for a group's syndicated customizable content document, the method comprising:
   providing an initial list of modules to an administrator of a group;
   enabling the administrator to identify module selection information, wherein the module selection information identifies criteria for at least one of inclusion or exclusion of one or more modules from the initial list of modules in a directory;
   storing the module selection information identified by the administrator, wherein storing comprises storing module indicators representing modules selected for inclusion or exclusion in one or more inclusion or exclusion lists, such that a user of the group's syndicated customizable content document is provided with a list of available modules based on the application of the one or more inclusion or exclusion lists depending on one or more of the user's chosen interests for a particular user status and an administrator decision whether to allow a combination of inclusion lists to apply to the user;
   providing, to a user of the group's syndicated customizable content document, a modified list of available modules based on the module selection information;
   receiving selection of one or more user modules for the user from the modified list of available modules; and
   providing a customized content document for the user to the user, the customized content document including both the selected user modules and content from the group's syndicated customizable content document.

2. The method of claim 1, wherein providing the initial list of modules comprises providing an unbounded list of available modules.

3. The method of claim 1, wherein providing the initial list of modules comprises providing a bounded list of available modules.

4. The method of claim 1, wherein providing the initial list of modules comprises providing modules based on a category chosen by the administrator.

5. The method of claim 1, wherein providing the initial list of modules comprises providing modules based on a search conducted by the administrator.

6. The method of claim 1, wherein enabling comprises providing the administrator with, for each listed module, one or more of:
   a corresponding toggle button to toggle between including and excluding the corresponding module;
   a corresponding checkbox to indicate the inclusion or exclusion of the corresponding module; and
   a corresponding radio button to indicate the inclusion or exclusion of the corresponding module.

7. The method of claim 1, wherein enabling comprises providing a list of categories, each category representing a subset of modules, from which the administrator can choose to include or exclude.

8. The method of claim 1, wherein storing comprises storing module indicators representing modules selected for inclusion in an inclusion list, such that the list of available modules includes only modules listed in the inclusion list.

9. The method of claim 1, wherein storing comprises storing module indicators representing modules selected for inclusion in one or more inclusion lists, such that the list of available modules includes only modules listed in the one or more inclusion lists, depending on the particular status of the user.

10. The method of claim 1, further comprising:
   enabling the administrator to create a custom category, wherein contents of the custom category is determined by the identified module selection information.

11. The method of claim 1, wherein providing a first list of modules to an administrator of a group includes providing, for a first module on the first list of modules, a suggested module that is similar to the first module, related to the first module, or popular with other users of the first module.

12. A system to facilitate the self-administration of a directory of available modules for a group's syndicated customizable content document, the system comprising:

a content document editor that presents an initial list of modules to an administrator of a group, and enables the administrator to identify module selection information, wherein the module selection information identifies criteria for at least one of inclusion or exclusion of one or more modules in a directory; and a memory that stores the module selection information identified by the administrator, wherein the system is configured to provide a user of the group's syndicated customizable content document with a modified list of available modules based on the module selection information such that the modified list includes or excludes modules identified for inclusion or exclusion by the module selection information based on the application of one or more inclusion or exclusion lists depending on one or more of the user's chosen interests for a particular user status and an administrator decision whether to allow a combination of inclusion lists to apply to the user, receive a selection of one or more user modules for the user from the modified list of available modules, and provide a customized content document for the user to the user, the customized content document including both the selected user modules and content from the group's syndicated customizable content document.

13. The system of claim 12, wherein the content document editor is located on a server and is accessible by the administrator over a network.

14. The system of claim 12, wherein the network is the Internet.

15. The system of claim 12, wherein the content document editor provides the initial list of modules to the administrator based on a category chosen by the administrator.

16. The system of claim 12, wherein the content document editor provides the initial list of modules to the administrator based on a search conducted by the administrator.

17. The system of claim 12, wherein the content document editor enables, for each listed module, the administrator to identify module selection information using one or more of:
   an add button;
   a delete button;
   a toggle button;
   a checkbox; or
   a radio button.

18. The system of claim 12, wherein the content document editor includes:
   a submit button configured to submit the module selection information.

19. The system of claim 12, wherein the content document editor is configured to provide, for a first module in the initial list of modules, a suggested module that is similar to the first module, related to the first module, or popular with other users of the first module.

20. A system to facilitate the self-administration of a directory of available modules on a group's syndicated customizable content document, the system comprising:
   a server maintained including a content document editor;
   a workstation that is configured to allow an administrator of a user group to access the content document editor, wherein the content document editor provides an initial list of modules to the administrator and enables the administrator to identify module selection information, wherein the module selection information identifies criteria for at least one of inclusion or exclusion of one or more modules in a directory, in which the criteria include including only modules relevant to a specific language; and
   a memory, maintained by the content document provider or the user group, to store the module selection information identified by the administrator,
   wherein the system is configured to provide a user of the group's syndicated customizable content document with a modified list of available modules based on the module selection information such that the modified list includes or excludes modules identified for inclusion or exclusion by the module selection information based on the application of one or more inclusion or exclusion lists depending on one or more of the user's chosen interests for a particular user status and an administrator decision whether to allow a combination of inclusion lists to apply to the user, receive a selection of one or more user modules for the user from the modified list of available modules, and provide a customized content document for the user to the user, the customized content document including both the selected user modules and content from the group's syndicated customizable content document.

* * * * *